235-380 SR
2/18/86 XR 4,571,489

United States Patent [19]
Watanabe

[11] Patent Number: 4,571,489
[45] Date of Patent: Feb. 18, 1986

[54] AUTOMATIC BANK NOTE TRANSACTION APPARATUS

[75] Inventor: Yoshihiro Watanabe, Fujisawa, Japan

[73] Assignee: Tokyo Shibaura Denki Kabushiki Kaisha, Japan

[21] Appl. No.: 510,164

[22] Filed: Jul. 1, 1983

[30] Foreign Application Priority Data

Jul. 12, 1982 [JP] Japan ................................ 57-121028

[51] Int. Cl.[4] ................................................ G06F 15/30
[52] U.S. Cl. ...................................... 235/379; 235/380
[58] Field of Search ......................................... 235/379

[56] References Cited

FOREIGN PATENT DOCUMENTS 2100906 6/1983 United Kingdom .

*Primary Examiner*—Harold I. Pitts
*Attorney, Agent, or Firm*—Cushman, Darby & Cushman

[57] ABSTRACT

In an automatic bank note transaction apparatus, deposited notes are circulated and appropriated for dispensation, as in the normal window operation, to improve the efficiency of fund operations. Those recovered notes which are missed at the time of depositing or dispensation are rechecked by a judgement mechanism so that identifiable notes are stored in the note storage sections for storing notes for dispensation, and only unidentifiable notes are collected in a storage section for recovery.

6 Claims, 25 Drawing Figures

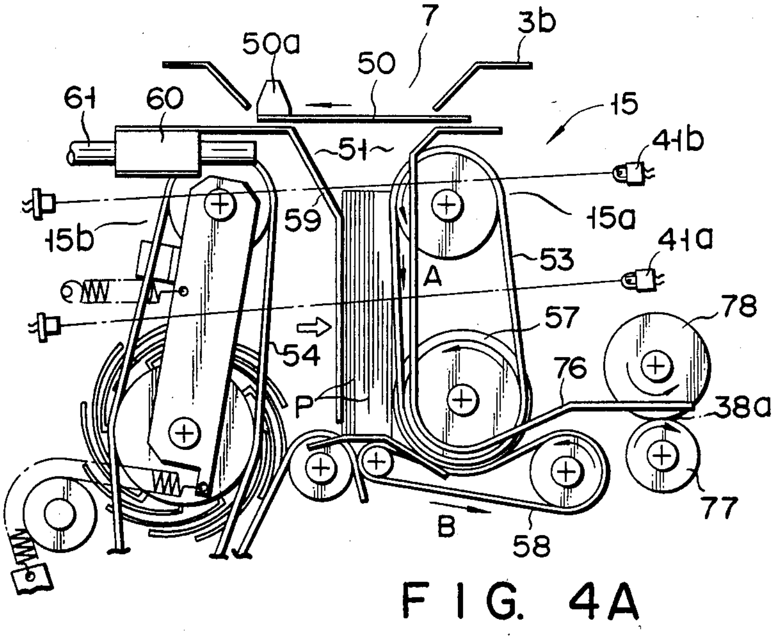
FIG. 4A
FIG. 4B
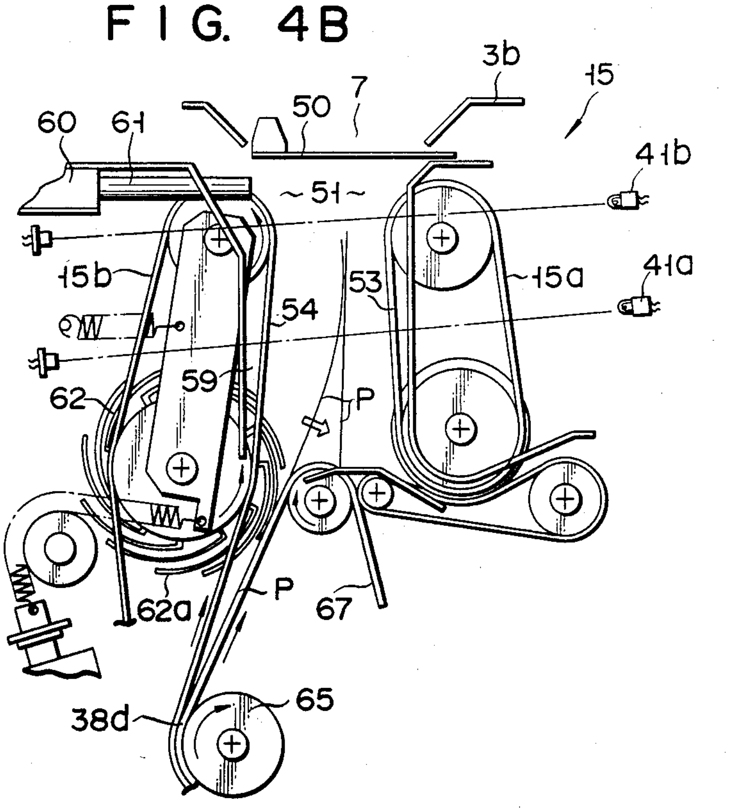

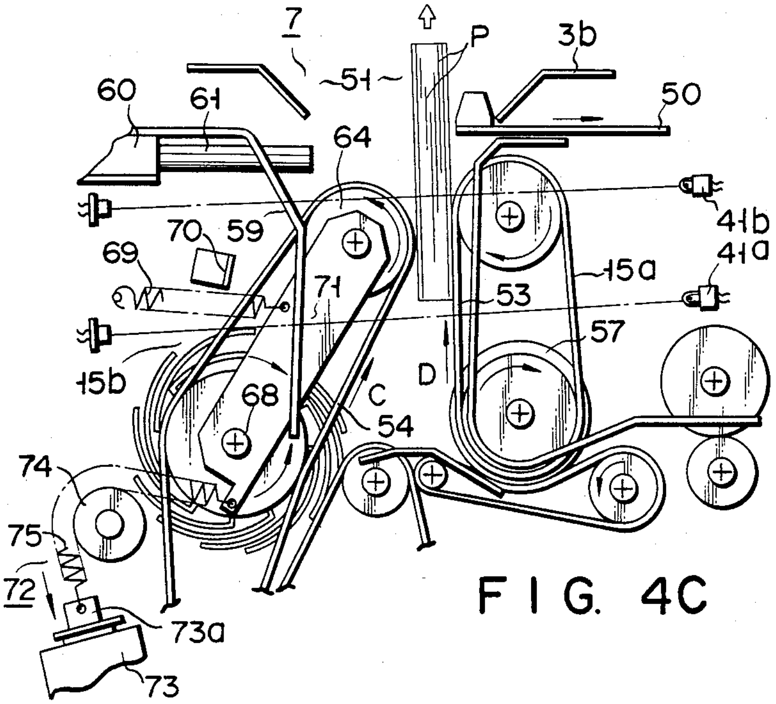
FIG. 4C
FIG. 5
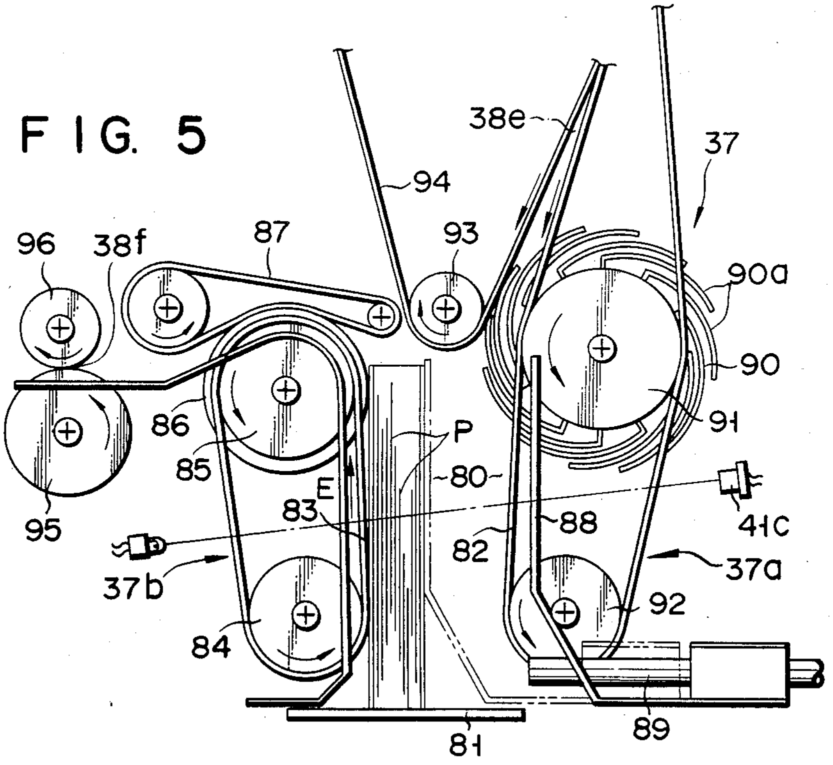

AUTOMATIC BANK NOTE TRANSACTION APPARATUS

BACKGROUND OF THE INVENTION

This invention relates to automatic bank note transaction apparatuses installed in automated corners of financial institutions, such as banks, for automatically depositing and dispensing notes.

Automatic bank note transaction apparatuses called ATM's (automated teller machines) have recently been put to practical use with excellent results. The ATM's are machines installed in automated sections of banks or other financial agencies, whereby a customer can draw or deposit money (bank notes) by himself automatically using a medium, such as a card, passbook, etc. The ATM's work even after the banks' windows are closed. The ATM's are also installed unattended in department stores, supermarkets, etc., and are expected to be used increasingly in the future.

However, the prior art ATM's consist of two independent units individually for a depositing function and a dispensing function. Accordingly, bank notes for dispensation will decrease steadily, so that a considerable number of notes will have to be previously stored in the apparatus. On the other hand, deposited notes will do nothing but increase, and have to be withdrawn very frequently. On the whole, therefore, the conventional ATM's do not have very high efficiency of fund operations.

SUMMARY OF THE INVENTION

This invention is contrived in consideration of these circumstances, and is intended to provide an automatic bank note transaction apparatus with very high efficiency of fund operations.

In order to attain the above object, an apparatus according to this invention has a construction such that deposited notes are circulated and appropriated for dispensation, as in the normal window operation, to improve the efficiency of fund operations, and that those recovered notes which are missed at the time of depositing or dispensation are rechecked so that identifiable notes are stored in storage sections for storing notes for dispensation, and that only unidentifiable notes are collected in a storage section for recovery.

BRIEF DESCRIPTION OF THE DRAWINGS

FIGS. 4A to 4C are side views for illustrating the operation of the note feed/takeout mechanism;

FIG. 5 is an enlarged side view of a reversal mechanism;

DETAILED DESCRIPTION OF THE PREFERRED EMBODIMENT

One embodiment of an automatic depositing/dispensing apparatus such as an automatic bank note transaction apparatus according to this invention will now be described in detail with reference to the accompanying drawings.

Figure 1:
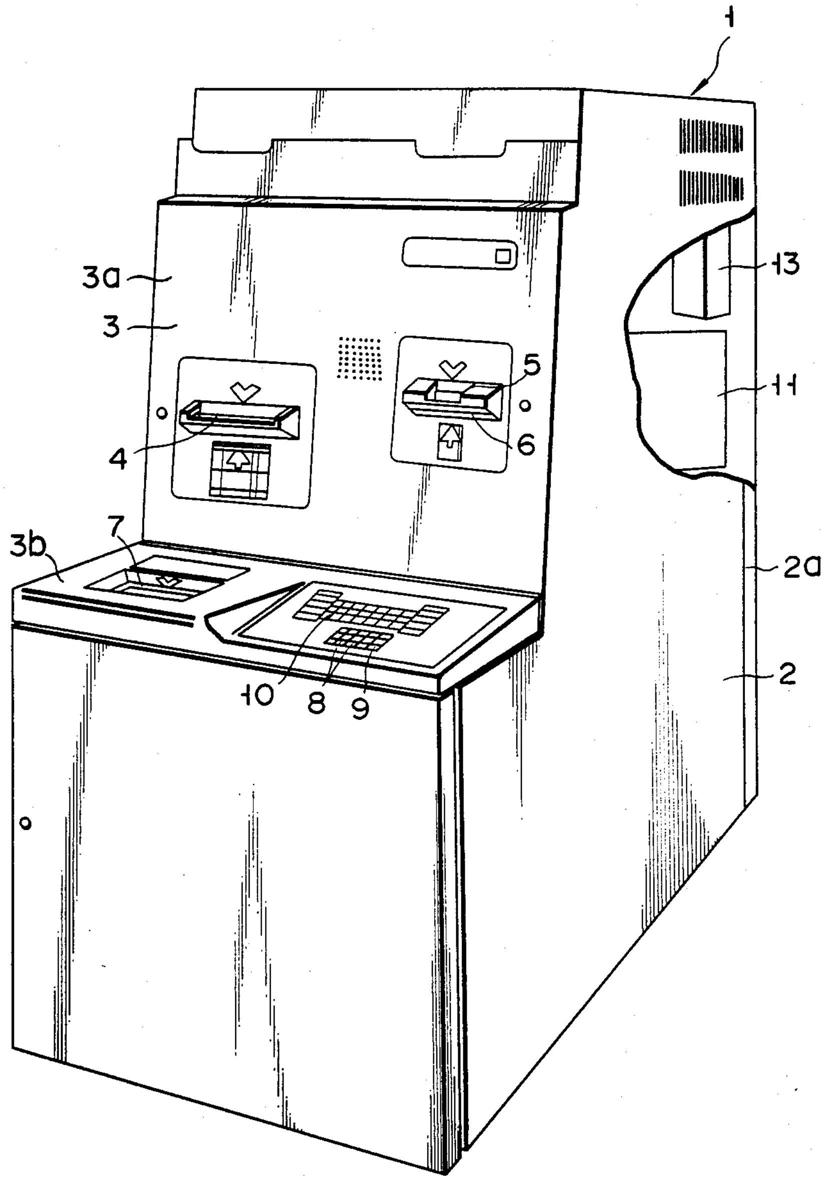
FIG. 1 is a partially broken-away, perspective view of one embodiment of an ATM according to this invention.

FIG. 1 shows an automatic depositing/dispensing apparatus 1 which has a housing 2. An operating panel section 3 is formed on the front side of the housing 2. The operating panel section 3 consists of a vertical panel section 3*a* and a horizontal panel section 3*b*. A passbook inlet slot 4, a card inlet slot 5 and a slip outlet slot 6 are formed on the vertical panel section 3*a*, while a note inlet/outlet port 7 serving both as a note inlet and a note outlet, an operating section 9 provided with a plurality of operating buttons 8, and a display section 10 are arranged on the horizontal panel section 3*b*.

A passbook reader/printer (not shown) and a card/-slip processing unit 11 are disposed in the housing 2. The passbook reader/printer receives a passbook inserted through the passbook inlet slot 4, reads and records magnetic information on the passbook, and prints the contents of transactions. The card/slip processing unit 11 handless a magnetic card inserted through the card inlet slot 5, delivers a slip to the slip outlet slot 6, and prepares a duplicate journal. The housing also contains therein a depositing/dispensing mechanism 12 (described in detail below) with a function to withdraw missed notes and an internal monitor unit 13.

Figure 2:
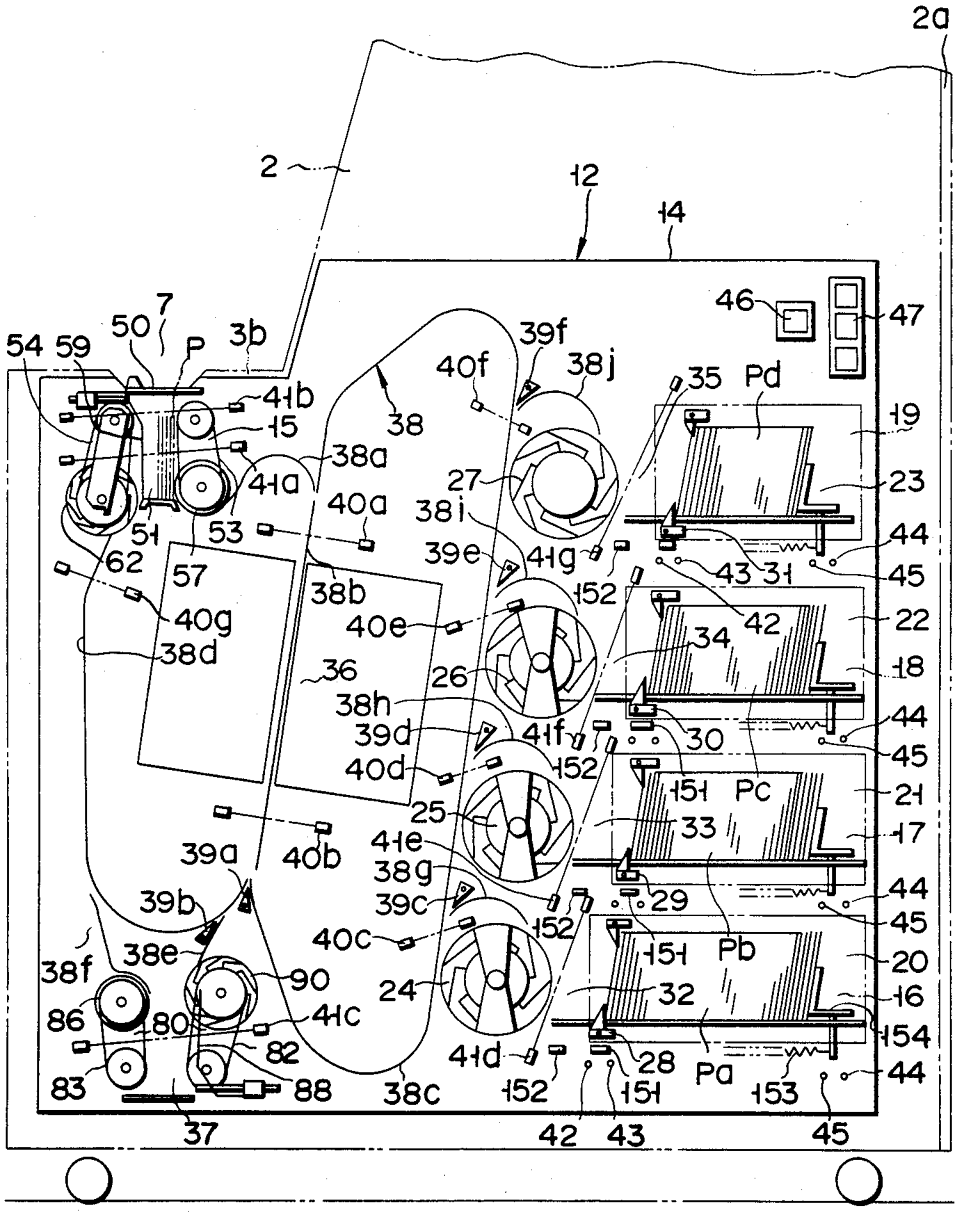
FIG. 2 is a side view schematically showing a depositing/dispensing mechanism.

Referring now to FIG. 2, the construction of the depositing/dispensing mechanism 12 will be described in detail. In FIG. 2, numeral 14 designates a unit housing of the depositing/dispensing mechanism 12. A note feed/takeout device 15 is provided at the upper front portion of the interior of the unit housing 14, corresponding to the note inlet/outlet port 7. The note feed/-takeout device 15 is constructed from a feed mechanism 15*a* and a takeout mechanism 15*b*. At the rear portion of the interior of the unit housing 14, first, second, third and fourth safe cassettes 16, 17, 18 and 19 are arranged in an ascending manner. The first, second, third and fourth safe cassettes 16, 17, 18 and 19 constitute, respectively, a first storage section 20 for storing first-denomination notes Pa (fifty-dollar notes, fifty-mark notes or ten-pound notes) and notes unsuitable for dispensing, such as rejected ones, a second storage section 21 for storing second-denomination notes Pb (hundred-dollar notes, hundred-mark notes or twenty-pound notes), a third storage section 22 for storing third-denomination notes Pc (ten-dollar notes, ten-mark notes or five-pound notes), and a fourth storage section 23 (recovery section) for storing withdrawn notes Pd. The first to fourth safe cassettes 16 to 19 can be drawn out backward from the housing 2 of the depositing/dispensing apparatus 1 by opening a rear door 2*a* of the housing 2.

First, second and third collection/takeout devices 24, 25 and 26 are arranged substantially halfway between the front and back walls of the unit housing 14 so as to face the first, second and third storage sections 20, 21 and 22, respectively, while a collection device 27 is opposed to the fourth storage section 23. The first to fourth storage sections 20, 21, 22 and 23 are provided, respectively, with first to fourth separator mechanisms 28, 29, 30 and 31 as partitioning means for separating those notes handled in the transaction concerned from those handled in the previous transactions. Temporary storage spaces 32, 33, 34 and 35 can be defined between the first to fourth separator mechanisms 28, 29, 30 and 31 and their corresponding collection/takeout devices 24, 25 and 26 and the collection device 27, respectively.

A judgment mechanism 36 is disposed in the rear portion of the interior of the unit housing 14 substantially halfway between the top and bottom of the unit housing 14. A reversal mechanism 37 is set below the judgment mechanism 36.

A note conveyor mechanism 38 is formed in the unit housing 14 so that notes P can be carried into those individual mechanisms. The note conveyor mechanism 38 consists of first to tenth note conveyor paths 38*a* to 38*j*. The first note conveyor path 38*a* feeds notes P inserted through the note inlet/output port 7 into the unit housing 14. The second note conveyor path 38*b* follows the first note conveyor path 38*a* and carries the notes P through the judgment mechanism 36. The third note conveyor path 38*c* follows the second note conveyor path 38*b*, and delivers the notes P passed through the judgment mechanism 36 to the starting end of the second note conveyor path 38*b* via the space beside the first to third collection/takeout devices 24, 25 and 26 and the collection device 27. The fourth note conveyor path 38*d* diverges from the terminal end of the second note conveyor path 38*b*, and delivers the notes P passed through the judgment mechanism 36 to the note inlet-/output port 7. The fifth note conveyor path 38*e* diverges from the middle portion of the fourth note conveyor path 38*d* and delivers the notes P to the reversal mechanism 37. The sixth note conveyor path 38*f* returns the notes P turned over by the reversal mechanism 37 to the fourth note conveyor path 38*d*. The seventh, eighth, ninth and tenth note conveyor paths 38*g*, 38*h*, 38*i* and 38*j* diverge individualy from the third note conveyor path 38*c*, and deliver the notes P to the first to third collection/takeout devices 24, 25 and 26 and the collection device 27, respectively. The note conveyor paths 38*a* to 38*j* are each defined by opposite portions of a pair of belts (not shown in detail) facing each other. First to sixth distributing gates 39*a* to 39*f* driven by a rotary solenoid (not shown) are arranged at the diverging portions of the note conveyor paths. Note passage sensors 40*a* to 40*g* are arranged at individual portions in the middle of the note conveyor paths 38*a* to 38*j*, while remaining note check sensors 41*a* to 41*g* are arranged at the individual collecting portions for collecting the notes P.

Each of the storage sections 20, 21, 22 and 23 is provided with a full detector 44, a preliminary full detector 45, an empty detector 42, and a preliminary empty detector 43.

Also, the unit housing 14 contains therein a circulation prohibiting switch 46 and a judgment level adjusting switch 47 which can be activated by opening the rear door 2*a*.

Referring now to FIGS. 3 and 4A to 4C, the note inlet/outlet port 7 and the note feed/takeout device 15 opposed thereto will be described in detail. In these drawings, numeral 50 designates a door member for opening and closing the note inlet/outlet port 7. A knob 50*a* of the door member 50 is recessed from the upper surface of the horizontal panel section 3*b* lest the door member 50 be blocked by a customer's personal items such as a handbag, placed thereon.

A note storage chamber 51 is defined under the note inlet/outlet port 7 which is opened and closed by the door member 50. The bottom portion of the note storage chamber 51 is defined by a guide plate 52, and both lateral face portions of the chamber 51 are defined by the opposite portions of first conveyor belts 53 provided in the feed mechanism 15*a* and second conveyor belts 54 provided in the takeout mechanism 15*b*.

The feed mechanim 15*a* is constructed as follows. A feed roller 57 is disposed coaxial with a lower pulley 55 out of a pair of pulleys 55 and 56 around which the first conveyor belts 53 are stretched. The feed roller 57 has a slightly greater diameter than the pulley 55 so that it projects beyond the surface of the first conveyor belts 53 on the pulley 55. The lower end portion of the feed roller 57 is in contact with a reversing brake belt 58 as a means for preventing the feed of two or more notes at a time.

A backup member 59 is disposed in a nested relation with the second conveyor belts 54. The backup member 59 is mounted on a guide shaft 61 by means of a linear bearing 60. The backup member 59 is moved along the guide shaft 61 by a backup member drive mechanism (not shown), and can press the notes P in the note storage chamber 51 against the first conveyor belt 53. It can also be moved to a position recessed from the second conveyor belts 54 such that it is removed from the note storage chamber 51.

The takeout mechanism 15*b* is constructed as follows. The second conveyor belts 54 are stretched around a pulley 63 integrally attached to a vane wheel 62 facing the feed roller 57, a pulley 64 located over the pulley 63, and a plurality of other pulleys 65 (only one shown). The facing portions of the second conveyor belts 54 and third conveyor belts 67 stretched around a pulley 66 at the bottom of the note storage chamber 51 and the pulleys 65 define part of the fourth note conveyor path 38*d* which carries out the notes P from the reversal mechanism 37 to the note storage chamber 51.

The pulley 64 is mounted on the free end portion of an arm 71 rockably around a shaft 68 of the vane wheel 62 and normally urged by a spring 69 to rock counterclockwise to a position where the arm 71 abuts against a stopper 70.

The arm 71 can be rocked clockwise around the shaft 68 against the urging force of the spring 69 by an arm drive mechanism 72. The pivotal end portion of the arm 71 is coupled to one end of the spring 75, the other end of which is connected to a plunger 73*a* of a plunger-type magnet 73. The spring 75, whose urging force is greater than that of the spring 69, is passed in the middle portion thereof around a guide pulley 74. Thus, the arm 71 is rocked clockwise against the urging force of the spring 69 by pulling the plunger 73*a*.

The notes P introduced by the feed roller 57 are fed along a guide plate 76 to be carried between conveyor rollers 77 and 78 which constitute a starting end of the first note conveyor path 38*a* of the note conveyor mechanism 38.

The note storage chamber 51 is provided with the remaining note check sensors 41*a* and 41*b* for detecting the existence of remaining note(s) P. Out of these two sensors 41*a* and 41*b*, the upper sensor 41*b* is located so that a certain space is kept between its optical axis and the upper end of a note P of the maximum size when the note P is securely set in the note storage chamber 51. In this state, the sensor 41*b* obtains a signal "light". The lower remaining note check sensor 41*a* is located so that a certain space is kept between its optical axis and the lower end of each note P when the upper end of the note P is projected above the note inlet/outlet port 7 at the time of dispensing or returning operation. In this state, the sensor 41*a* obtains a signal "light".

Figure 3:
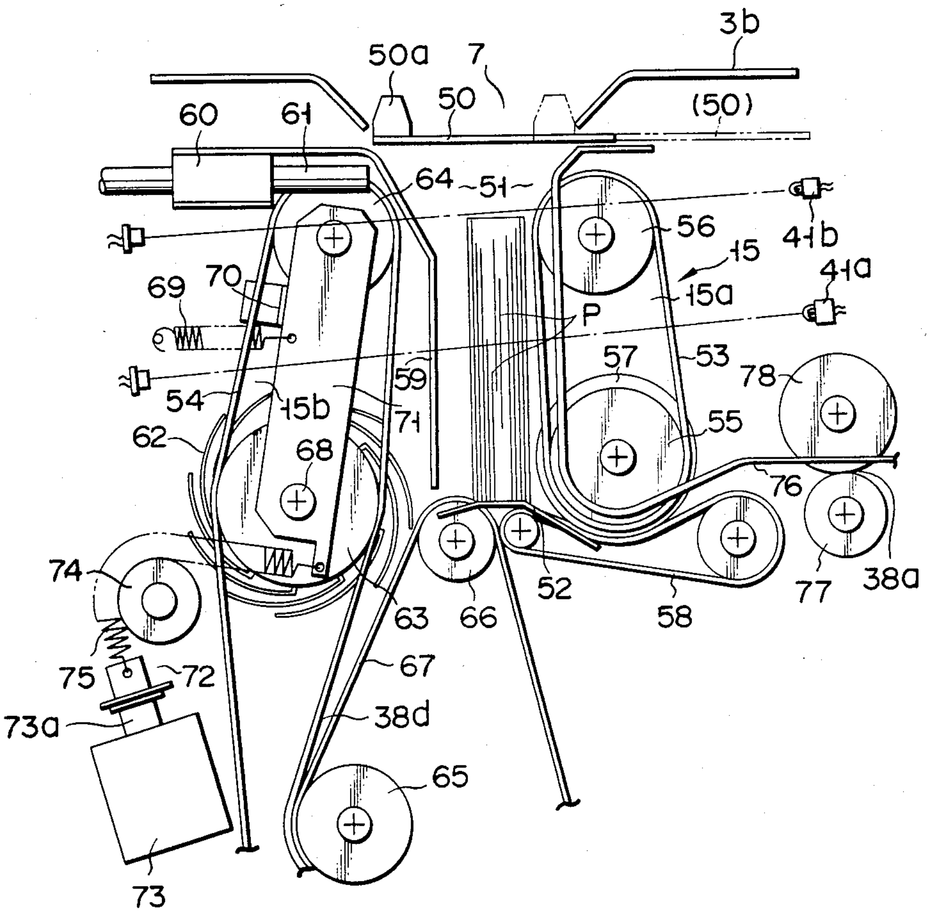
FIG. 3 is an enlarged side view showing a note feed/-takeout device.

Referring now to FIGS. 3 and 4A, the manner of note insertion at depositing will be explained. When a customer gives an instruction for depositing, the door member 50 is pulled to the right of FIG. 3 by a motor (not shown) to be located in the position indicated by two-dot chain line, thereby opening the note inlet/outlet port 7. At this time, the backup member 59 is located in the position shown in FIG. 3. Accordingly, the customer can collectively insert a bundle of notes P of mixed denomination and orientation and in a vertical position into the note storage chamber 51 through the note inlet/outlet port 7. After the insertion, the customer holds the knob 50*a* and slides the door member 50 to the left to close the note inlet/outlet port 7 as a signal for the end of the insertion. A detector (not shown) detects the closing of the port 7, and a note feeding step is started in the following manner.

First, the first conveyor belt 53 travels in the direction of arrow A of FIG. 4A. As the belt 53 travels in this manner, the feed roller 57, with a high-friction rubber baked on part of the peripheral surface thereof, starts to rotate counterclockwise. At the same time, the backup member 59 is moved to the right by the backup member drive mechanism (not shown) to press the bundle of notes P to the right against the feed roller 57 and the first conveyor belt 53, as shown in FIG. 4A. In doing this, a spring (not shown) is attached to the backup member 59 and interposed between the backup member 59 and the bundle of notes P pushed thereby, so that the bundle can securely be pressed against the roller 57 and the belt 53 without regard to its thickness, and that the backup member drive mechanism will never be overloaded.

Thus, only a single note P in contact with the feed roller 57 is fed as the feed roller 57 rotates counterclockwise. At this time, the second and the following notes P are prevented from being fed with the first one by the reversing brake belt 58 which is rotated in the direction of arrow B opposite to the note feed direction. Thus, the notes P in the note storage chamber 51 are delivered one by one to be carried between the conveyor rollers 77 and 78 which define the starting end of the first note conveyor path 38*a*.

Referring now to FIG. 4B, the operation for collecting in the note storage chamber 51 those notes P which are returned to the note inlet/output port 7 through the fourth note conveyor path 38*d* will be described. At the time of returning operation, the note inlet/outlet port 7 is closed by the door member 50, and the backup member 59 is moved to the left to retreat from the note storage chamber 51 so that the forward ends of notes P fed upward by means of the vane wheel 62 can be inserted between the opposite surfaces of the first and second conveyor belts 53 and 54.

Hereupon, each of the notes P carried up one by one through the fourth note conveyor path 38*d* of the note conveyor mechanism 38, that is, the leading edge of each of the notes P carried between the second and third conveyor belts 54 and 67 is thrust between each two adjacent vanes 62*a* of the vane wheel 62 rotating counterclockwise. Then, the note P is fed upward to reach a predetermined position, guided at the forward end by the second conveyor belt 54. Then, the forward end of the note P slips out of the vane wheel 62. Meanwhile, the rear end portion of the note P is held between the vane 62*a* of the vane wheel 62 and the third conveyor belt 67, so that the note P is carried upward. Therefore, when the rear end portion of the note P reaches a position off the third conveyor belt 67, the note P is flipped to the right by the following vane 62*a*. Thereupon, the note P is collected in the note storage chamber 51, fully spaced from the second conveyor belt 54. At this moment, the following note P is inserted between the previously collected note P and the second conveyor belt 54, and is collected in the note storage chamber 51 following the same steps as aforesaid.

After a series of collecting operations is completed in this manner, those notes P, such as rejected ones at depositing, which require rereading, are subjected to repeated feeding operation as described with reference to FIG. 4A, with the door member 50 left closed.

The following operation is performed in the case where the customer is expected to withdraw those notes directly returned or dispensed without undergoing rereading, like the automatically returned notes at depositing or automatically dispensed notes. In this case, the backup member 59 is left in the left-hand position, as shown in FIG. 4C. the magnet 73 is energized when the notes P are stopped from being fed, so that the arm 71 mounted with the pulley 64 with the second conveyor belt 54 thereon is rocked clockwise around the shaft 68. Thus, the bundle of notes P in the note storage chamber 51 is held between the first and second conveyor belts 53 and 54.

Thereafter, the door member 50 is opened, and the second conveyor belt 54 is driven in the direction of arrow C at a reduced speed equal to a tenth of the normal feed speed, while the first conveyor belt 53 is driven in the direction of arrow D at a speed reduced to the same degree. Thus, the bundle of notes P is elevated. The conveyor belts 53 and 54 are driven until the lower remaining note check sensor 41*a* turns to "light", and are then stopped.

Since the bundle of notes P is stopped where it is projected from the note inlet/outlet port 7 for the most part, the customer can take it out with ease.

Secured by the urging force of the spring 75, the bundle of notes P will neither fall into the note storage chamber 51 nor be blown off by the wind.

The customer's extraction or reception of the bundle of notes P is detected as the signal from the upper remaining note check sensor 41*b* turns to "light". When the reception of the notes P is detected in this manner, the note inlet/outlet port 7 is closed by the door member 50, and the magnet 73 is deenergized to return the arm 71 to its original position. Also, the backup member 59, which has so far been located in the left-hand position shown in FIG. 4C, is returned to the position shown in FIG. 3, and the next step is started.

If the signal from the remaining note check sensor 41*b* does not turn to "light" after the passage of a given time, then the mechanism concludes that the customer has failed to take out the notes P, and starts operation for recovery. This recovery operation is performed as follows. First, the first and second conveyor belts 53 and 54 holding the notes P between them are driven in the directions opposing to the directions of arrows C and D of FIG. 4C at a reduced speed equal to a tenth of the normal feed speed, and the notes P are fed until the upper remaining note check sensor 41*b* turns to "light". The change of the remaining note check sensor 41*b* to "light" indicates that all the notes P are fully taken into the note storage chamber 51. At this point of time, therefore, the magnet 73 is deenergized to return the arm 71 mounted with the pulley 64 with the second conveyor belt 54 thereon to its original position, and the note inlet/outlet port 7 is closed by the door member 50.

Thereafter, the notes P are fed one by one in the manner described before in connection with the normal feeding operation for depositing with reference to FIG. 4A.

Referring now to FIG. 5, the reversal mechanism 37 will be described in detail. In FIG. 5, numeral 80 designates a temporary collection chamber. The bottom portion of the temporary collection chamber 80 is defined by a guide plate 81, and both lateral face portions of the chamber 80 are defined by the opposite portions of the respective conveyor belts 82 and 83 of a collection mechainsm 37*a* and a takeout mechanism 37*b*. The takeout mechanism 37*b* is constructed as follows. A takeout roller 86 is coaxially attached to an upper pulley 85 out of a pair of pulleys 84 and 85 around which is stretched the conveyor belts 83 defining the left-hand side face of the temporary collection chamber 80. The takeout roller 86 has a slightly greater diameter than the pulley 85 so it projects radially outward beyond the surface of the conveyor belts 83 on the pulley 85. The upper end portion of the takeout roller 86 is in contact with a reversing brake belt 87 as a means for preventing the feeding of two or more notes at a time.

A backup member 88 is disposed in a nested relation with the conveyor belts 82 defining the right-hand side face of the temporary collection chamber 80. This backup member 88 has the same construction with the backup member 59 facing the note inlet/outlet port 7. Namely, the backup member 88 can move along a guide shaft 89 to press the notes P in the temporary collection chamber 80 against the left-hand conveyor belts 83 by means of a spring, or to be located in a position recessed from the right-hand conveyor belts 82 such that it is removed from the temporary collection chamber 80.

The collection mechanism 37*a* is constructed as follows. The right-hand conveyor belts 82 are stretched around a pulley 91 integrally attached to a vane wheel 90 facing the takeout roller 86, a pulley 92 located under the pulley 91, and a plurality of other pulleys (not shown). The facing portions of the right-hand conveyor belt 82 and a conveyor belt 94 stretched around a pulley 93 over the temporary collection chamber 80 and other pulleys (not shown) define the fifth note conveyor path 38*e* which feeds the notes P distributed by the gate 39*b* into the temporary collection chamber 80.

In the collection mechanism 37*a* thus constructed, the leading edge of each of the notes P carried one by one between the conveyor belts 82 and 94 is thrust between each two adjacent vanes 90*a* of the vane wheel 90 rotating counterclockwise, and is collected in a vertical position in the temporary collection chamber 80, as in the operation of the note feed/takaout device 15.

After the completion of the temporary collection, the notes P are taken out one by one in response to a takeout signal, with their upper end portions, which have been on the rear end side at the time of insertion, located on the forward end side. Thus, the notes P are turned over. Namely, in response to the takeout signal, the left-hand conveyor belts 83 start to travel in the direction of arrow E, and the takeout roller 86 starts to rotate counterclockwise, as in the operation of the note feed/takeout device 15. As the takeout roller 86 rotates in this manner, the backup member 88 moves from the position indicated by the solid line to the left-hand position indicated by two-dot chain line, thereby pressing the notes P against the takeout roller 86 and the left-hand conveyor belts 83. Then, the notes P are taken out one by one, headed by that note P which is directly pressed against the takeout roller 86. Thus, the notes P are carried betwen the conveyor rollers 95 and 96 which constitute the starting end of the sixth note conveyor path 38*f*.

The existence and nonexistence of the note(s) P in the temporary collection chamber 80 are detected in response to signals "dark" and "light", respectively, from the remaining note check sensor 41*c*.

Figure 6A:
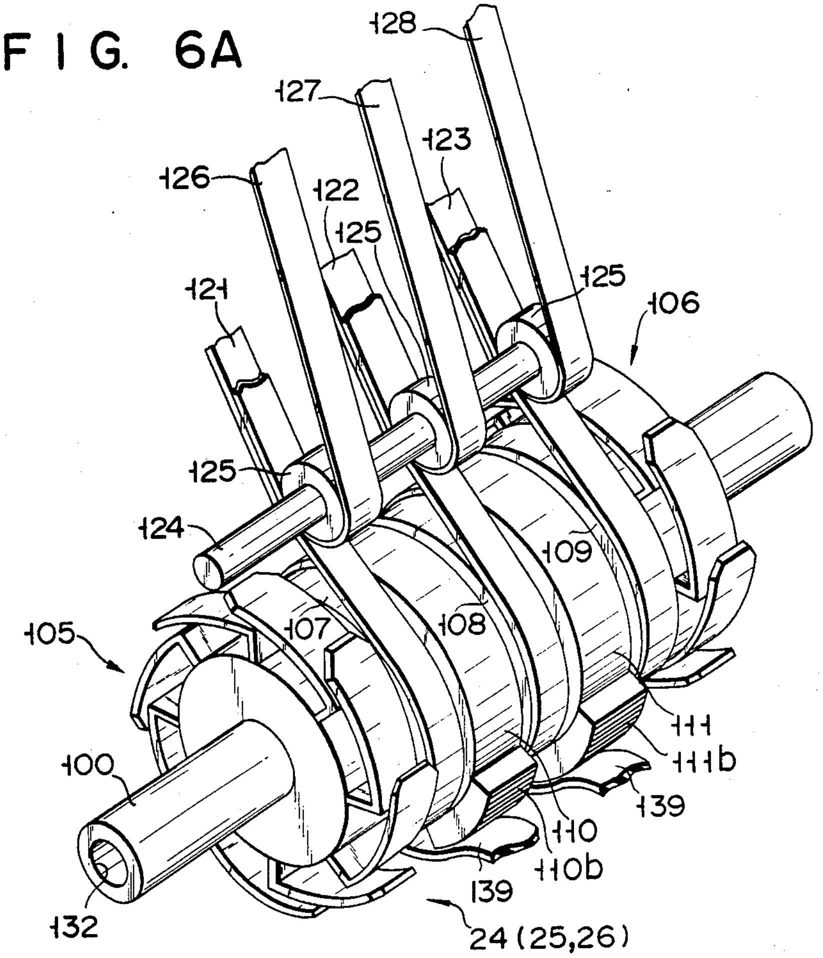
FIG. 6A is perspective view of a collection/takeout device.
Figure 6B:
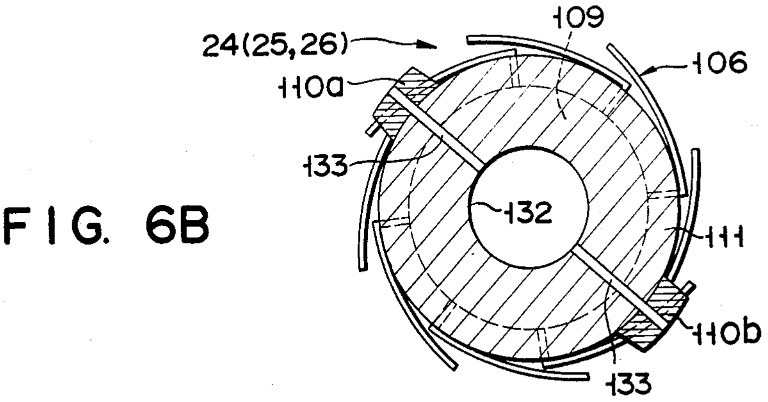
FIG. 6B is a sectional view of a rotor of the collection/takeout device.
Figure 7:
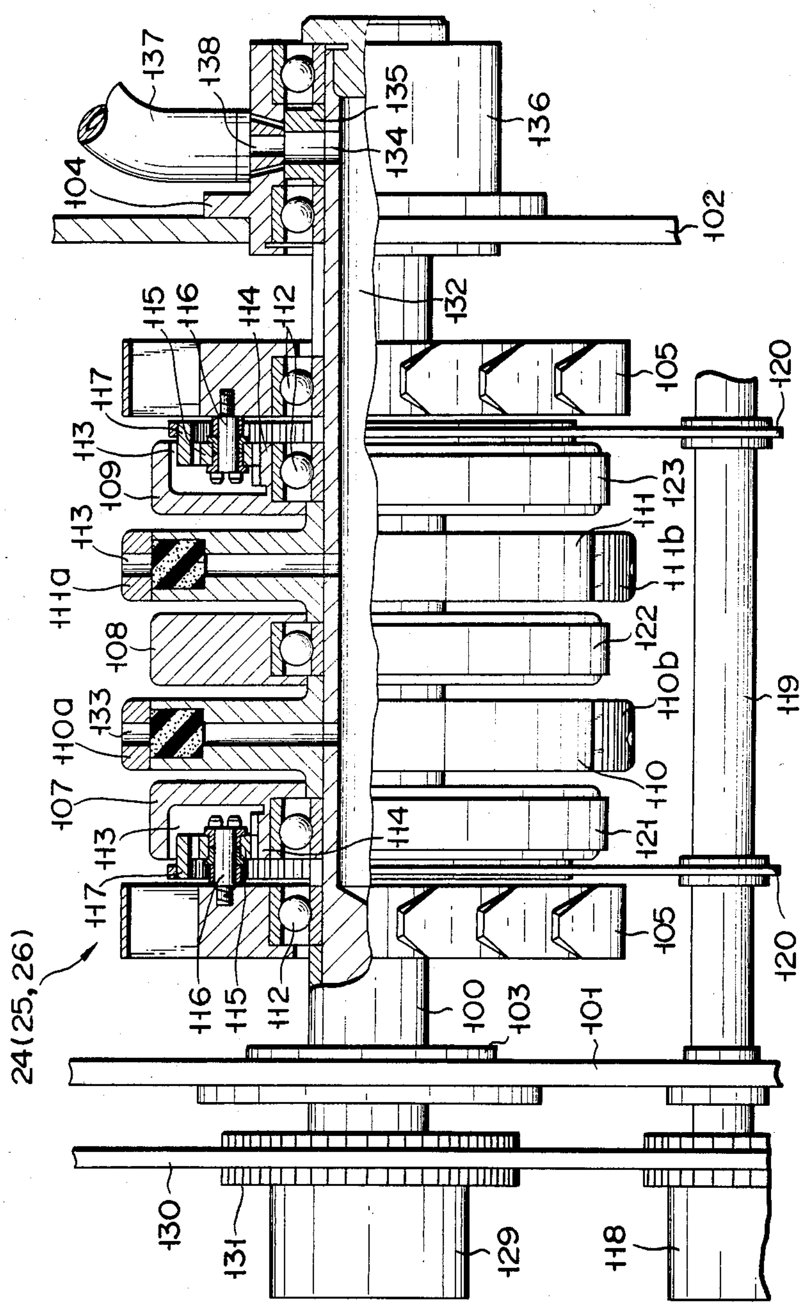
FIG. 7 is a front view of a partial cross section showing the collection/takeout mechanism.

Referring now to FIGS. 6A, 6B and 7, the first, second and third collection/takeout devices 24, 25 and 26 will be described in detail. These collection/takeout devices 24, 25 and 26 have the same construction, and serve to collect and take out the notes.

Each of the collection/takeout devices 24, 25 and 26 is provided with a main shaft 100. The main shaft 100 is rotatably supported at both ends by bearing units 103 and 104 which are attached to frames 101 and 102, respectively, in the housing 14. The main shaft 100 is fitted with a pair of collecting vane wheels 105 and 106, first to third belt pulleys 107, 108 and 109, and a pair of rotors 110 and 111 as takeout mechanisms including a pair of takeout chips 110*a* and 110*b* and another pair of chips 111*a* and 111*b*, respectively. All these members on the main shaft 100 are located between the frames 101 and 102. The vane wheels 105 and 106 and the first and third belt pulleys 107 and 109 are rotatably mounted on the main shaft 100 by means of their respective bearings 112, while the rotors 110 and 111 are fixedly attached to the main shaft 100.

The first and third belt pulleys 107 and 109 are coupled to the vane wheels 105 and 106, respectively, by means of planetary-gear reduction mechanisms 113. Thus, the vane wheels 105 and 106 rotate at a speed reduced to a sixteenth of the rotating speed of the belt pulleys 107 and 109. As shown in FIG. 7, a gear 114 is coaxially fixed in each of the first and third belt pulleys 107 and 109. The gear 114 is in mesh with a plurality of planet gears 115. Rotating shafts 116 of the planet gears 115 are fixed to the body portion of their corresponding vane wheel 105 or 106. Also, the planet gears 115 of each pulley 107 or 109 are in mesh with an internal gear 117. The internal gears 117 of the pulleys 107 and 109 are driven by belts 120 and a common rotating shaft 119 which is controlled in rotation by an electromagnetic clutch 118. Thus, these two internal gears 117 are operated synchronously. In collecting the notes, the internal gears 117 are fixed, so that the vane wheels 105 and 106 rotate at a speed equal to a sixteenth of that of the belt pulleys 107 and 109. In taking out the notes, the internal gears 117 are forced to rotate so that the rotors 110 and 111 and the vane wheels 105 and 106 rotate at the same speed and in the same direction.

First, second and third conveyor belts 121, 122 and 123 are passed around the first, second and third belt pulleys 107, 108 and 109, respectively. Among these conveyor belts 121, 122 and 123, the first and third belts 121 and 123 on the first and third belt pulleys 107 and 109 which interlock with the first and third vane wheels 105 and 106, respectively, are formed of timing belts (toothed belts) lest the vanes of the vane wheels 105 and 106 be dislocated from one another. These timing belts reiatively fix timing pulleys (not shown) on another shaft (not shown) to drive the two conveyor belts 121 and 123.

As shown in FIG. 6A, a rotating shaft 124 is disposed parallel to the main shaft 100. Three pulleys 125 are fixed on the rotating shaft 124. Conveyor belts 126, 127 and 128 are passed around the pulleys 125 and turned up. Parts of the conveyor belts 121, 122 and 123 overlap the turnup portions of the conveyor belts 126, 127 and 128, respectively. The facing portions of these conveyor belts constitute the seventh, eighth or ninth conveyor path 38*g*, 38*h* or 38*i* whereby the notes distributed by the distributing gate 39*c*, 39*d* or 39*e* are held and carried into the spaces between the vanes of the vane wheels 105 and 106.

A timing pulley 131 is mounted on the main shaft 100 by means of a half-turn electromagnetic clutch 129. A timing belt 130 is passed around the timing pulley 131. The drive force of the timing pulley 131 is transmitted to the main shaft 100 when the half-turn electromagnetic clutch 129 is connected. The main shaft 100 is stopped except when taking out the notes. Each of the rotors 110 and 111 integrally attached to the main shaft 100 is fitted with the takeout chips 110*a* and 111*a* or 110*b* and 111*b* arranged on the peripheral surface thereof at a phase angle of 180°. As shown in FIG. 6B, some takeout chips 110*a* and 111*a* are stopped at such positions that they never interfere with the insertion and collection of the notes in the vane wheels 105 and 106. The other takeout chips 110*b* and 111*b* serve also as stoppers to draw out the notes from the spaces between the vanes.

The takeout chips 110*a*, 110*b*, 111*a* and 111*b* are formed of high friction knurled rubber baked on the peripheral surfaces of the rotors 110 and 111. Each of the takeout chips has a suction hole 132 which communicates with a bore 132 formed in the main shaft 100 so as to extend along its axis. A valve mechanism 135 having a communication hole 134 connecting with the bore 132 is fitted on one end portion of the main shaft 100. When the main shaft 100 is intermittently rotated by 180° at a time by the half-turn electromagnetic clutch 129, the valve mechanism 135 rotates relatively to a housing 136 with a narrow gap between them. The housing 136 has a suction hole 138 which communicates with an external vacuum generator (not shown) by means of a pipe 137. The suction hole 138 and the communication hole 134 of the valve mechanism 135 face and connect with each other at every predetermined timing for takeout. Accordingly, the pressure inside the bore 132 of the main shaft 100 becomes negative at every predetermined takeout timing, so that the pressure inside the suction holes 133 of the takeout chips 110*a*, 111*a*, 110*b* and 111*b* of the rotors 110 and 111 connecting with the bore 132 also becomes negative.

Thus, as the half-turn electromagnetic clutch 129 is actuated to cause the main shaft 100 to make a half turn, the suction holes 133 of the takeout chips 110*a* and 111*a* or 110*b* and 111*b* of the rotors 110 and 111 are subjected to negative pressure. Accordingly, the foremost note facing the paths of travel of the takeout chips 110*a*, 111*a*, 110*b* and 111*b* is sucked by a vacuum, and is taken out as the rotors 110 and 111 rotate. The note taken out in this manner is inserted between the conveyor belts 121, 122 and 123 and another set of conveyor belts (not shown) superposed thereon. The intermittent operation of the half-turn electromagnetic clutch 129 is performed by exciting a trigger magnet to release a trigger pin.

As shown in FIG. 6A, a pair of brake belts 139 are arranged opposite to the paths of travel of the takeout chips 110*a*, 111*a*, 110*b* and 111*b*. The brake belts 139 serve to rub the note, thereby preventing the second note and the following ones from being taken out with the first one.

While the outer peripheral surfaces of the takeout chips 110*a*, 111*a*, 110*b* and 111*b* are substantially flush with those of the vane wheels 105 and 106, the conveyor belts 121, 122 and 123 are radially recessed from the outer peripheral surfaces of the vane wheels 105 and 106.

Figure 8:
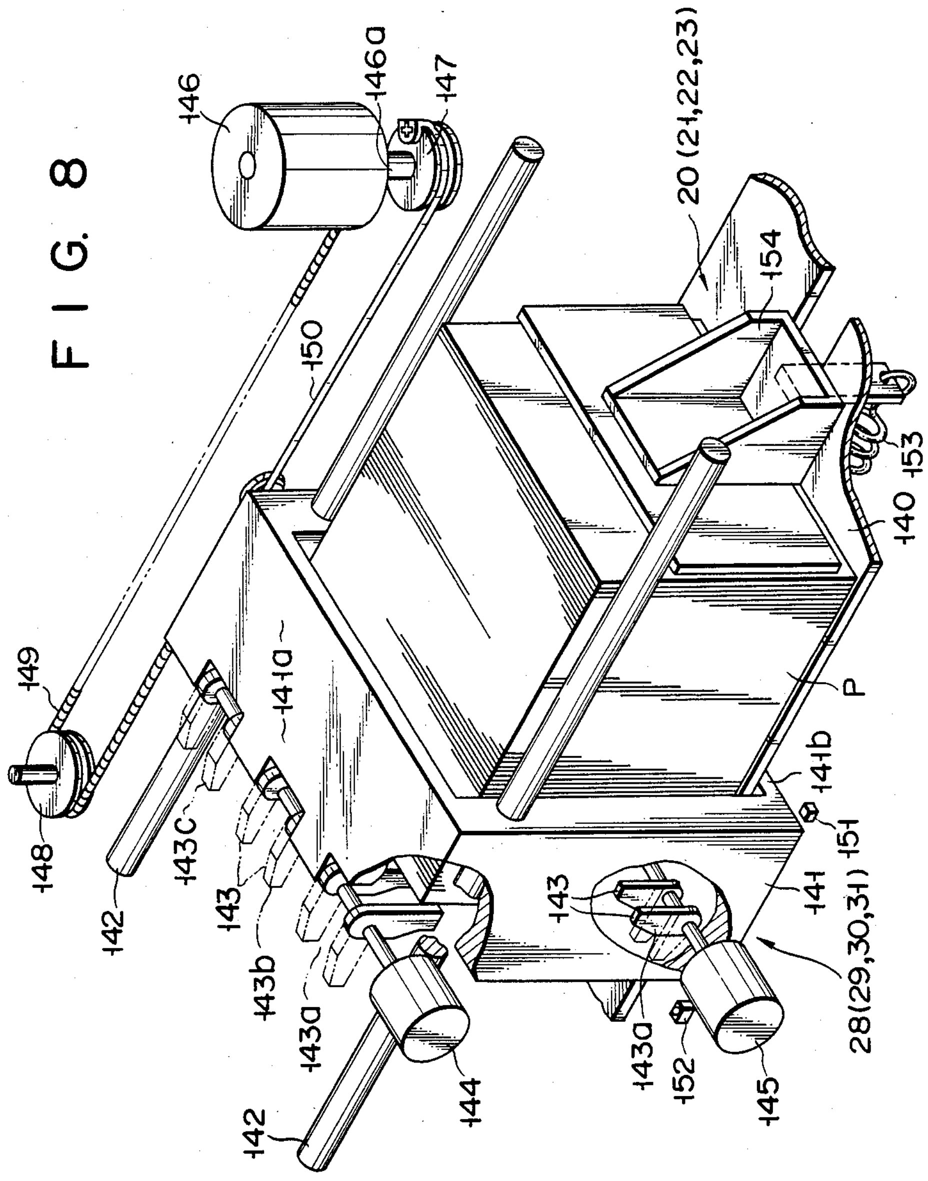
FIG. 8 is a partially cutaway, perspective view of a separator mechanism.

Referring now to FIG. 8, there will be described the construction of the separator mechanisms 28, 29, 30 and 31 as the partitioning means. These separator mechanisms 28, 29, 30 and 31 have the same construction. Each of the first to fourth storage sections 20, 21, 22 and 23 is provided with a fixed bearer 140, and a rectangular movable frame 141 surrounding the notes collected on the bearer 140. The movable frame 141 is supported by a pair of guide rods 142 so as to be able to reciprocate in the note collecting direction. Each of the separator mechanisms 28, 29, 30 and 31 is provided with three sets of flappers 143*a*, 143*b* and 143*c* each consisting of two pairs of claws 143 arranged on upper and lower horizontal frame portions 141*a* and 141*b* of the movable frame 141. The upper and lower pairs of flappers 143*a*, 143*b* and 143*c* can be rotated by rotary solenoids 144, 145, respectively, in a 90-degree arc between a horizontal position represented by two-dot chain lines and an upright position represented by full lines.

A driving pulley 147 mounted on a drive shaft 146*a* of a motor 146 having a reduction gear is disposed in the vicinity of one end of the one guide rod 142, while a driven pulley 148 is located close to the other end of the rod 142. The movable frame 141 is connected with one end of a spring belt 149 the other end of which is fixed to the frame portion near the driving pulley 147 and the middle portion of which is passed around the driven pulley 148 and turned up, and with one end of a wire 150 the other end of which is coupled to the driving pulley 147. An initial position detector 151 and an advanced position detector 152 are individually disposed beside the bearer 140 to keep the movable frame 141 in a normal stop position. Normally, the movable frame 141 is held in the position where the initial position detector 151 is located. The movable frame 141 is normally pushed toward its corresponding collection/takeout device 24, 25 or 26 or collection device 27 by the collected notes that are held against a backup member 154 urged by a pressure spring 153. The pressure on the movable frame 141 from the pressure spring 153 is approximately 1.2 kg/cm$^2$ in the case where the storage section 16, 17, 18 or 19 is loaded with 1,400 notes, i.e., the maximum load. This pressure is about one third the force required to reverse the motor 146 having a 1/100-reduction gear, i.e., 3.5 kg/cm$^2$. Even after the motor 146 is deenergized, therefore, the movable frame 141 will never be moved from the position of the position detector 151 or 152.

The upper and lower flappers 143*a*, 143*b* and 143*c* are located in such relative positions that the takeout chips 110*a*, 111*a*, 110*b* and 111*b* of the rotors 110 and 111 can pass between the flappers 143*a*, 143*b* and 143*c*, and that the conveyor belts 121, 122 and 123 can pass between the claws 143 of the flappers 143*a*, 143*b* and 143*c*, respectively. Thus, even though the movable frame 141 advances to the advanced position, the flappers 143*a*, 143*b* and 143*c* will never abut against the collection/takeout devices 24, 25 and 26, and collection device 27.

When the motor 146 drives the driving pulley 147 in the forward direction, the wire 150 is wound up to retreat against the urging force of the spring belt 149 the movable frame 141 which has its upper and lower horizontal frame portions fitted with the flappers 143*a*, 143*b* and 143*c*. When the motor 146 drives the driving pulley 147 in the reverse direction, on the other hand, the movable frame 141 is advanced by the urging force of the spring belt 149.

The flows of notes P in the depositing operation, dispensing operation, and recovery operation will now be described with reference to FIGS. 9 to 11, FIG. 12 and FIG. 13, respectively, as well as to FIG. 2.

Figure 9:
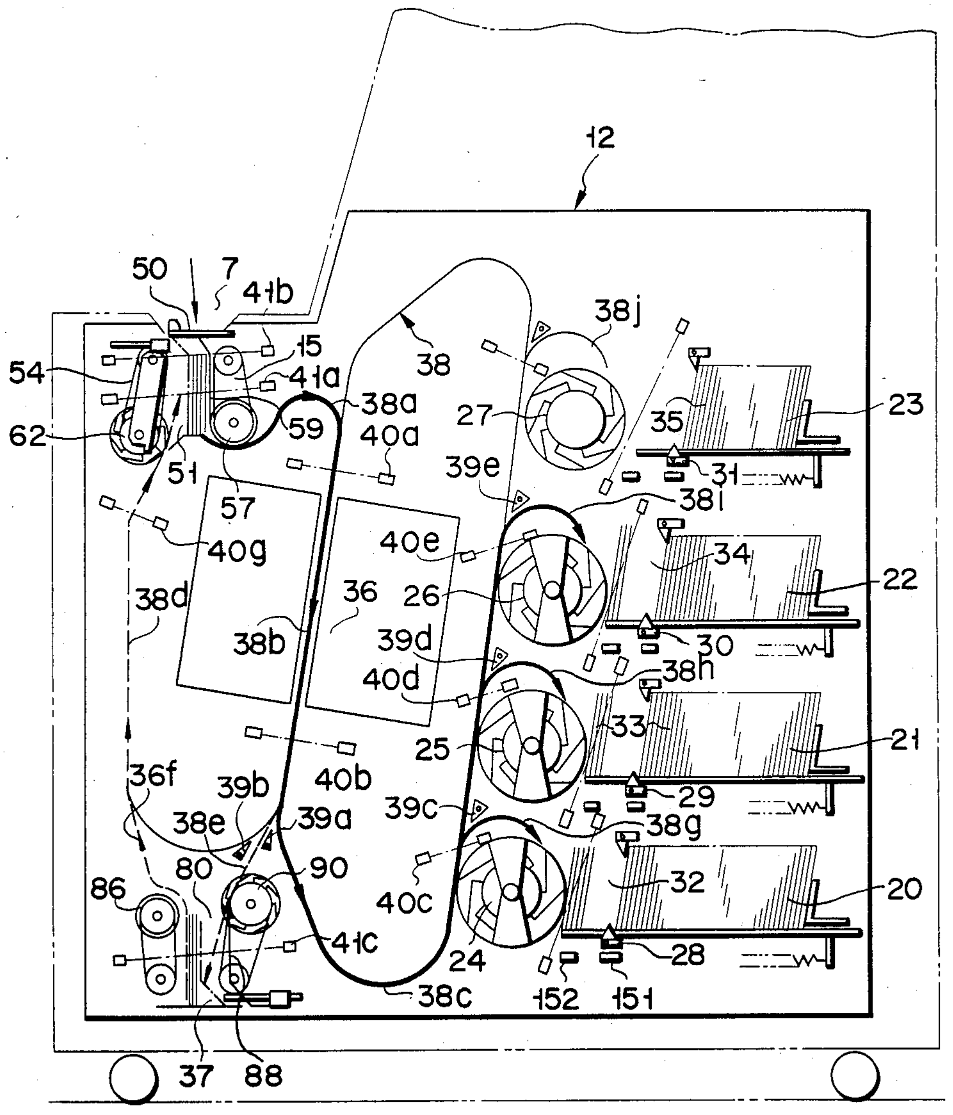
FIG. 9 is a side view for schematically illustrating the flow of deposited notes being collected or rejected into temporary storage spaces.

Referring first to FIGS. 2 and 9, operations for temporary collection and rejection of deposited notes P will be explained. First, the customer performs a designating operation for depositing, and the door member 50 slides to open the note inlet/output port 7 for the insertion of notes P to be deposited. Then, the customer collectively puts a bundle of notes P of mixed denomination and orientation and in a vertical position into the note storage chamber 51 through the note inlet/output port 7. Thereafter, the customer slides the door 50 to close the note inlet/outlet port 7 as a signal for the end of the insertion. Then, the notes P in the note storage chamber 51 are fed one by one into the apparatus by means of the feed roller 57, as described before in connection with FIGS. 3 and 4A. The introduced notes P are counted by the first note passage sensor 40*a* while successively shifting their passage, and are delivered to the judgment mechanism 36.

The note judgment system used in this judgment mechanism 36 is quite different from the conventional judgment system which checks the notes for partial characteristics. Namely, in this judgment mechanism 36, the notes P are checked for the width, length, magnetic pattern matching, color analysis of transmitted light, and fine-section matching by reflected light, thereby effecting the four detecting functions of the judgment section 36; denomination detection, authenticity detection, fit/unfit detection, and obverse/reverse detection. Deposited notes P are subjected only to the denomination detection and authenticity detection.

If there are any notes P which are judged counterfeit or not genuine by the authenticity detection because they are superposed, greatly skewed, or damaged, then the first and second distributing gates 39*a* and 39*b* are rocked to the right and left to close the third and fourth note conveyor paths 38*c* and 38*d*, respectively, at the instant that the forward end portion of each counterfeit note reaches the second note passage sensor 40*b*. After reaching the terminal end of the second note conveyor path 38*b*, the rejectable notes P are collected in the temporary collection chamber 80 of the reversal mechanism 37 through the fifth note conveyor path 38*e*, as indicated by broken-line arrow in FIG. 9. The rejected notes P are kept in the temporary collection chamber 80 until the deposited notes P in the note storage chamber 51 facing the note inlet/outlet port 7 cease to be fed into the apparatus. When it is detected through the signal "light" from the remaining note check sensor 41*a* that all the notes P in the note storage chamber 51 have been fed into the apparatus, the rejected notes P in the temporary collection chamber 80 are taken out one by one by the takeout roller 86 in the manner described in connection with FIG. 5. Then, the rejected notes P are carried through the sixth and fourth note conveyor paths 38*f* and 38*d*, and collected in the note storage chamber 51 facing the note inlet/outlet port 7, as described before with reference to FIG. 4B.

The rejected notes P thus collected in the note storage chamber 51 are fed again into the apparatus to be rechecked.

Those notes P which have been judged genuine by the authenticity detection are fed to the third note conveyor path 38*c* by the first distributing gate 39*a* rocked to the left to close the fourth note conveyor path 38*d*, as indicated by thick solid-line arrow. Thereafter, the first-denomination notes Pa are fed through the third distributing gate 39*c* to the seventh note conveyor path 38*g* which leads to the first storage section 20. Likewise, the second-denomination notes Pb are fed through the fourth distributing gate 39*d* to the eighth note conveyor path 38*h* which leads to the second storage section 21, and the third-denomination notes Pc are fed through the fifth distributing gate 39*e* to the ninth note conveyor path 38*i* which leads to the third storage section 22. At this moment, in the storage sections 20, 21 and 22, their corresponding separator mechanisms 28, 29 and 30 are located in the initial position, and the previously stored notes P are pressed by the upper and lower flappers 143*a*, 143*b* and 143*c*. Thus, the temporary storage spaces 32, 33 and 34 are defined in front of the collection/takeout devices 24, 25 and 26, respectively.

The notes P carried between the set of conveyor belts 121, 122 and 123 and the other set of belts 126, 127 and 128 (FIG. 6A) constituting the seventh, eighth or ninth note conveyor paths 38*g*, 38*h* or 38*i* are collected in their corresponding temporary storage space 32, 33 or 34 by means of the vane wheels 105 and 106 of their corresponding collection/takeout device 24, 25 or 26 rotating at low speed, as described before with reference to FIGS. 6A, 6B and 7.

When the remaining note check sensor 41*a* detects that all the notes P in the note storage chamber 51 facing the note inlet/output port 7 have been taken into the apparatus, the remaining note check sensor 41*c* checks the reversal mechanism 37 for the existence of the note(s) P. If there is any note or notes P in the reversal mechanism 37, they are returned to the note storage chamber 51, and fed again into the apparatus to be re-checked. If there is no note in the reversal mechanism 37, the apparatus proceeds to an approval step to decide on whether the temporarily stored notes P are to be collected together with the previously collected notes P in the storage sections 20, 21 and 22, or whether the notes P are to be automatically returned to the note inlet/outlet port 7.

Figure 10:
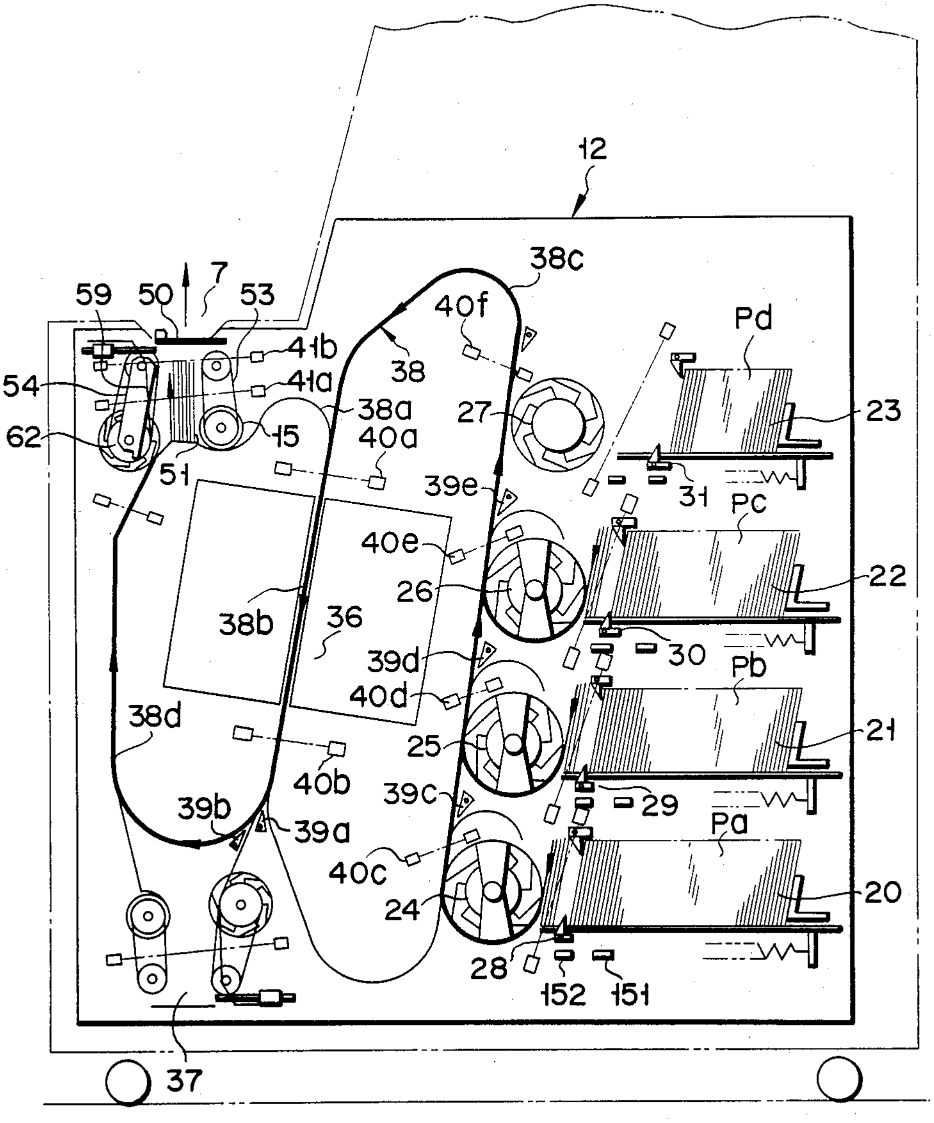
FIG. 10 is a side view for schematically illustrating the flow of deposited notes being returned from the temporary storage spaces.

Referring now to FIGS. 2 and 10, there will be described the automatic returning operation for the deposited notes P collected in the temporary storage sapces 32, 33 and 34. When the introduction of the notes P is completed to change the sensor 41*a* at the note inlet/outlet port 7 from "dark" to "light", the approval step is started. In this approval step, a CPU (central processing unit) of the automatic depositing/dispensing apparatus communicates with a host computer keeping a ledger, based on an on-line system. If the deposited notes P cannot be accepted because, for example, the depositor's passbook is not in order, then a command "unacceptable" is delivered from the host computer. In this case, the deposited notes P are returned automatically.

Namely, the rejected notes P from the individual temporary storage spaces 32, 33 and 34 are carried to the note inlet/outlet port 7 through the third, second and fourth note conveyor paths 38*c*, 38*b* and 38*d*.

When the temporarily stored notes P are thus returned to the note storage chamber 51 facint the note inlet/outlet port 7, the door member 50 slides open so that the upper ends of the notes P in a bundle collectively project from the note inlet/outlet port 7, as described before with referenc to FIG. 4C.

The depositor's reception of the automatically returned notes can be detected through the change from "dark" to "light" of the sensor 41*a* which detects the existence or nonexistence of notes P in the note storage chamber 51. Thereafter, the motors 152 for the individual storage sections 20, 21, 22 and 23 are driven to pull the movable frames 141. Thus, the movable frames 141 of all the separator mechanisms 28, 29, 30 and 31 are returned to their initial positions detected by the detectors 152 to complete a series of operations. Also, the motors 146 are stopped. Thus, the state shown in FIG. 2 is resumed.

The flappers 143*a*, 143*b* and 143*c* should be thick enough to prevent the previously collected notes P. First, the motors 146 of the separator mechanisms 28, 29 and 30 are rotated to drive the corresponding movable frames 141 toward their corresponding advanced position detectors 152.

Hereupon, each detector 152 is set in such a position that it operates when there is no temporarily stored note, that is, when each corresponding movable frame 141 is advanced to its foremost position. If any notes are stored temporarily, therefore, the movable frame 141 is stopped from advancing at the position where the flappers 143*a*, 143*b* and 143*c* abut against the notes, and the wire 150 slackens. This is done because the drive motor 146 is a pulse motor which drives the movable frame 141 for a distance equal to the distance from the initial position to the advanced position. Since the wire 150 is thus slackened, the flappers 143*a*, 143*b* and 143*c*, urged by the spring 153, press the temporarily stored notes P against their corresponding collection/takeup device 24, 25 or 26 through the medium of their corresponding backup member 154 and the collected notes P.

Thereupon, the half-turn electromagnetic clutches 129 are engaged, and the second-, third- and first-denomination notes Pb, Pc and Pa are taken into the apparatus in the order named, and are stacked in the note storage chamber 51 facing the note inlet/outlet port 7.

The introduction of the notes in the individual storage sections will be considered to have been completed if the remaining note check sensors 41*d*, 41*e* and 41*f* are changed from "dark" to "light", when the separator mechanisms 28, 29 and 30 reach their corresponding advanced position detectors 152, and if no notes are delivered to the passage sensors 40*c*, 40*d* and 40*e* even though the vane wheels 105 and 106 are raced for some five turns. In FIG. 10, a full-line arrow represents the flow of deposited notes P to be returned.

The flappers 143*a*, 143*b* and 143*c* should be thick enough to prevent the previously collected notes P inside the separator mechanisms 28, 29 and 30 from being picked up together with the notes stored in the temporary storage spaces 32, 33 and 34 to be returned automatically. Preferably, the thickness of each flapper ranges from 10 mm to 15 mm. Therefore, lightweight plastics, such as polyacetal, should be used as the material for the flappers 143*a*, 143*b* and 143*c*.

When the flappers 143*a*, 143*b* and 143*c* are in their foremost positions, there are gaps of 0.5 mm between these flappers and the vane wheels 105 and 106. To maintain these gaps, stoppers (not shown) are attached individually to the front sides of the separator mechanisms 28, 29 and 30.

Figure 11:
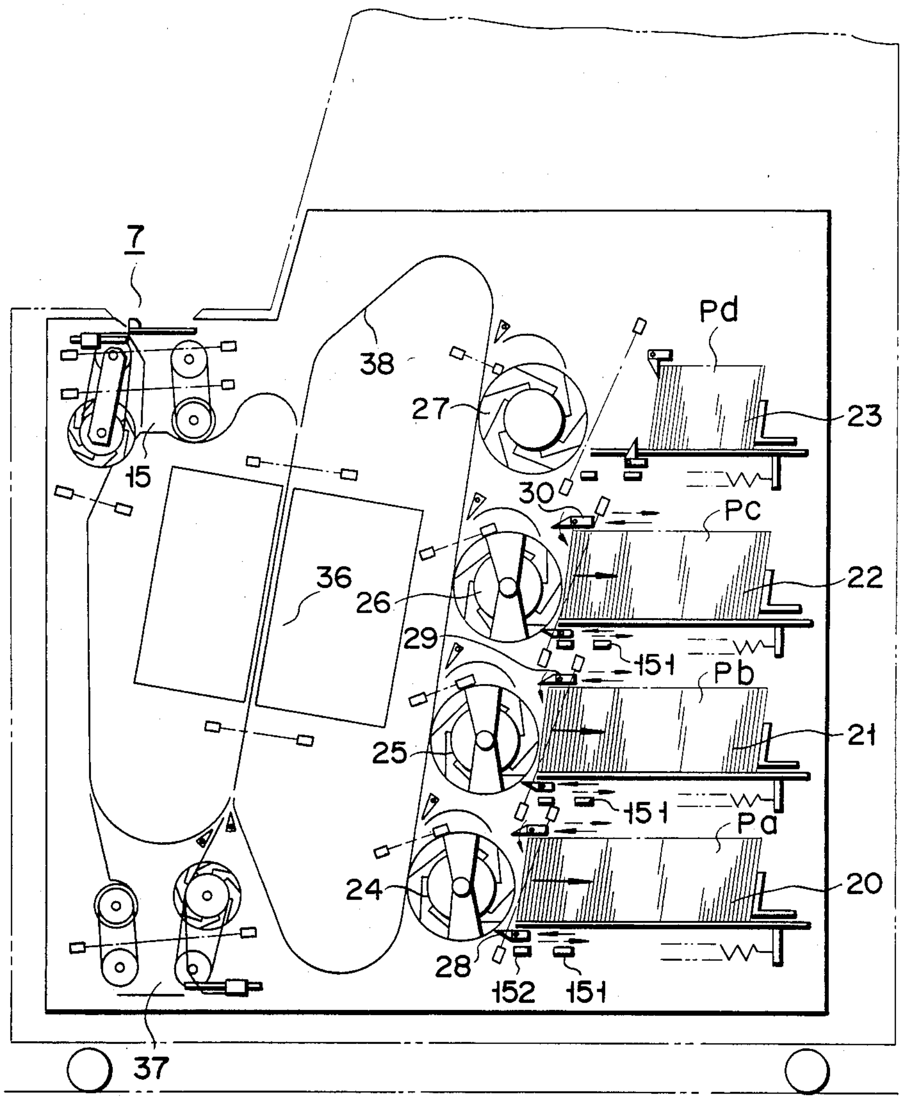
FIG. 11 is a side view for schematically illustrating the feed of deposited notes from the temporary storage spaces into their corresponding storage sections.

Referring now to FIGS. 2, 8 and 11 the manner of receiving the deposited notes will be described. When the sensor 41*b* at the note inlet/outlet port 7 is changed from "dark" to "light" after the introduction of the notes P is completed, the approval step is started. If a command "acceptable" is obtained after on-line communication with the host computer when the approval button is depressed, the rotary solenoids 144 and 145 shown in FIG. 8 are actuated to swing both the upper and lower flappers 143*a*, 143*b* and 143*c* to the horizontal position. As a result, the groups of notes P previously stored in the individual storage sections 20, 21 and 22 are pushed forward by the backup members 154 urged by the pressure springs 153. Thus, these notes P join those collected in the temporary storage spaces 32, 33 and 34, and abut against their corresponding collection/takeout devices 24, 25 and 26. Thereafter, the motors 146 are reversed to move the movable frames 141 mounted with the separator mechanisms 28, 29 and 30 toward the advanced positions while keeping the rotary solenoids 144 and 145 excited so that the flappers 143*a*, 143*b* and 143*c* are horizontal. Then, meeting with no resistance from the notes P, the movable frames 141 advance and reach the advanced position (FIG. 11). At the same time, the flappers 143*a*, 143*b* and 143*c* enter the gaps between the conveyor belts 121, 122 and 123 and the vane wheels 105 and 106 and between the belts 121, 122 and 123 and the takeout chips. In this position, if the rotary solenoids 144 and 145 are deenergized, the flappers 143*a*, 143*b* and 143*c* rotate through 90° to set their claws 143 in the upright position. If the motors 146 are then rotated in the forward direction, the whole sets of notes P are pulled back by the wires 150 to resume the initial state (FIG. 2).

Figure 12:
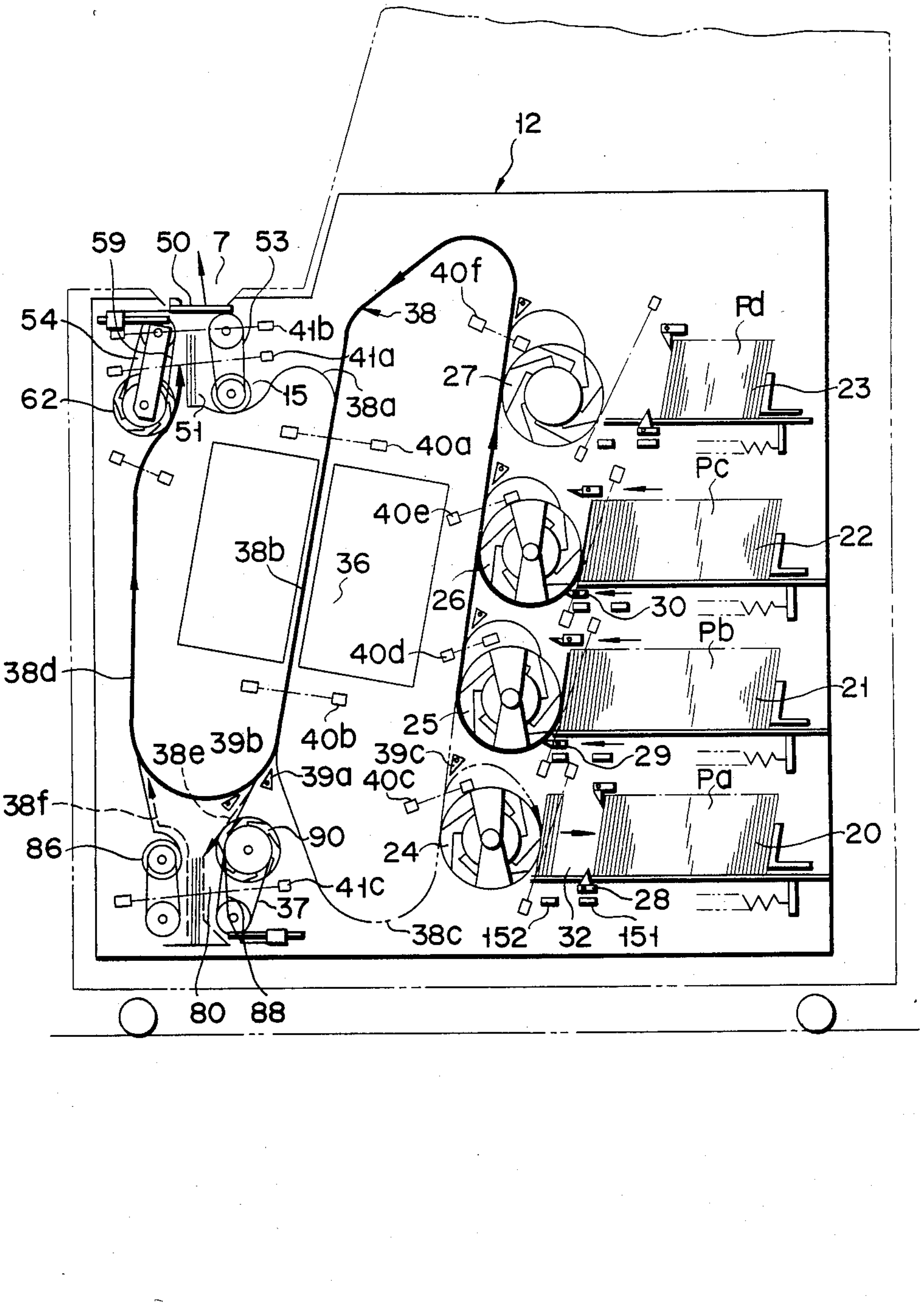
FIG. 12 is a side view for schematically illustrating the flow of notes to be dispensed.

Referring now to FIGS. 2 and 12, the cash dispensing operation will be described in detail.

After the denominations and amount of notes P to be dispensed are designated by means of the operating section 9, the CPU of the depositing/dispensing apparatus communicates with the host computer on the basis of the on-line system for the collation of balance in the passbook account. If the designated amount is less than the balance, the apparatus starts to make arrangements for payment or dispensation. First, the rotary solenoids 144 and 145 are actuated to make the flappers 143*a*, 143*b* and 143*c* of the separator mechanisms 29 and 30 of the second and third storage sections 21 and 22 horizontal. As a result, the third- and second-denomination notes Pc and Pb, which have so far been held in the third and second storage sections 22 and 21 with gaps kept from the collection/takeout devices 26 and 25 by the flappers 143*a*, 143*b* and 143*c*, are pressed against the collection/takeout devices 26 and 25, respectively, by the backup members 154 urged by the pressure springs 153, as shown in FIG. 12. The separator mechanisms 30 and 29 and their corresponding movable frames 141 are not moved by the motors 146, and are held in the positions detected by the initial position detectors 151.

This is done because if the lower flappers 143*a*, 143*b* and 143*c* advance to their advanced positions, they penetrate into the spaces between the belts 121, 122 and 123, the vane wheels 105 and 106, and the takeout chips 110*a* and 111*a* or 110*b* and 111*b*, to interfere with the introduction of the notes P.

In taking out the second-denomination notes Pb from the second storage section 21, the external vacuum generator or vacuum pump is operated to raise the degree of vacuum inside the bore 132 which extends along the axis of the main shaft 100. The suction holes 133 in the takeout chips 110*a*, 111*a*, 110*b* and 111*b* connect with the bore 132 to be subjected to negative pressure. Thus, the second-denomination notes Pb are attracted to the takeout chips 110*a* and 111*a* or 110*b* and 111*b*. Meanwhile, the notes Pb are separated from one another between the takeout chips and the brake belts 139 for preventing the feed of two superposed notes, and are delivered to the eighth conveyor path 38*h*. The detector 40*d* detects the delivery of the second-denomination notes Pb to the third conveyor path 38*c*, and counts the delivered notes Pb. Since a designated number of notes are thus detected and counted by the detector 40*d* positioned as illustrated, an extra second-denomination note Pb will be taken out even if the half-turn electromagnetic clutch 129 is released immediately after the delivery of the designated number of notes. This extra note Pb is handled as a rejected note which lowers the efficiency of fund operations.

In this embodiment, therefore, the rotors 110 and 111 are rotated continuously until the number of the second-denomination notes Pb counted by the detector 40*d* reaches the designated number minus one. Thereafter, the rotors 110 and 111 are driven for a half turn, and the detector 40*d* detects the delivery of an additional second-denomination note Pb. Thereupon, the delivery or takeout of the second-denomination notes Pb from the second storage section 21 is considered to have been completed.

If a single second-denomination note Pb is required to be dispensed, then it is taken out by causing the rotors 110 and 111 as the takeout mechanisms to make only a half turn without the use of the detector 40*d*. The second-denomination note Pb taken out in this manner is passed through the judgment section 36 for the denomination detection, authenticity detection, fit/unfit detection and obverse/reverse detection.

The denomination detection is not required for those notes which have been examined at depositing. However, it is required for those notes Pb which are set in the second safe cassette 17 for supplementation by a clerk in charge because they are subject to setting errors.

For the same reason, the authenticity detection is also required at dispensation. Superposed notes are handled as counterfeit notes, since they do not clearly show their features.

The most soiled note should be accepted so long as it is a distinguishable genuine note at depositing. Soiled genuine notes are referred to as unfit notes, which are to be replaced with new notes and abandoned by the National Bank.

These unfit notes must absolutely be prevented from being delivered to customers. At the time of dispensation, therefore, the notes P must be examined thoroughly, and those notes which are soiled, damaged, mended with adhesive tape, and/or dog-eared, and are therefore judged unfit, must be rejected. These unfit notes are fed to the third conveyor path 38*c*, as indicated by two-dot chain line in FIG. 12, as the distributing gate 39*a* is rocked to the left by the rotary solenoid (not shown) so as to close the fourth conveyor path 38*d* when the forward ends of the notes P reach the detector 40*b*. While the notes P are being taken out, the distributing gate 39*c* is kept in the left position to close the third conveyor path 38*c* so that the rejected unfit notes are fed and collected in the first storage section 20 through the seventh conveyor path 38*g*.

Thus, the first storage section 20, which receives only the first-denomination notes Pa at depositing, receives the rejected unfit notes at dispensation. Normally, in the dispensing operation, the rotors 110 and 111 with the takeout chips 110*a*, 111*a*, 110*b* and 111*b* thereon are stopped when the counted number of notes reaches the designated number minus one, and are then rotated an additional half turn for the designated number, as mentioned before. If there are such rejected notes, they are not counted, and the dispensing operations is continued.

The orientation and denomination of the deposited notes P are normally mixed up when they are set in the note storage chamber 51 through the note inlet/outlet port 7. At the window of a financial agency, tellers always orient notes P before they hand them to their customers. In the automatic depositing/dispensing apparatus, the notes to be dispensed are oriented as follows. As the first and second distributing gates 39*a*, 39*b* are turned to right and the left, respectively, so as to close the third and fifth conveyor paths 38*c* and 38*e*, uninverted notes P are transferred to the fourth conveyor path 38*f*. If the notes P are judged reversed by the obverse/reverse detection at the judgment section 36, then the second distributing gate 39*b* is turned to the left to close the fourth conveyor path 38*d* when the forward ends of the notes P reach the sensor 40*b*. Thus, the reversed notes P are temporarily collected on the bearer 81 of the reversal section 37 through the fifth conveyor path 38*e*, as indicated by broken line in FIG. 12. The collection at the reversal section 37, is achieved by the use of the vane wheels 90. Unreversed notes P are passed straight through the fourth conveyor path 28*d* to be collected in the note storage chamber 51 without being fed to the reversal section 37, as indicated by fullline arrow in FIG. 12. After a designated number of second-denomination notes Pb are all collected in the note storage chamber 51 and/or the reversal section 37, the second-denomination notes Pb in the reversal section 37 are transferred to the note storage chamber 51. The vane wheels 62 in the note storage chamber 51 serve to slow down the movement of the notes P delivered thereto one after another at high speed, thereby softly guiding and collecting the notes P. So long as the number of the notes P delivered is not more than a predetermined number, the vane wheels 62 can guide the notes P also collectively. If the predetermined number is exceeded, the notes P will run out of the vane wheels 62 causing defective collection.

During the takeout of the notes P, therefore, those notes P judged reversed by the judgment section 36 are counted. When the counted number of the reversed notes P reaches a predetermined value even though the designated number for the takeout is not reached yet, the takeout operation is interrupted. In this state, the reversed notes P are transferred from the reversal section 37 to the note storage chamber 51, and then the takeout operation is resumed and continued until the designated number is reached.

When the takeout of the second-denomination notes Pb from the second storage section 21 is completed in this manner, the same operation is repeated for the third-denomination notes Pc from the third storage section 22. The third-denomination notes Pc are stacked over the second-denomination notes Pb. After the takeout is all completed, the drive of the conveyor belts 121, 122, 123, 126, 127 and 128 and the vacuum pump is stopped. When the upper sensor **41*b* detects the customer's receipt of the dispensed notes P, the respective motors 146 of the separator mechanisms 30 and 29 at the third and second storage sections 22 and 21 are rotated in the reverse direction to advance the separator mechanisms 30 and 29 until they are detected by their corresponding advanced position detectors 152. Thereafter, the rotary solenoids 144 and 145 are deenergized to erect the flappers 143*a*, 143*b* and 143*c*, and the motors 146 are rotated in the forward direction to pull back the separator mechanisms 30 and 29 by means of the wires 150 until the mechanisms 30 and 29 are detected by their corresponding initial position detectors 151. Thus, the state of FIG. 2** is established.

If there are any rejected notes P, the same operation as the deposited note collection is performed for the first storage section 20. First, the flappers **143*a*, 143*b* and 143*c* are made horizontal to advance the separator mechanism 28. Then, the flappers 143*a*, 143*b* and 143*c* are erected, and the separator mechanism 28 is pulled back to the initial position by the motor 146** so that the rejected notes P at dispensation can be collected together with the deposited first-denomination notes Pa.

In taking out the notes P by means of the rotors 110 and 111 as the takeout mechanisms, every two adjacent notes P are rubbed by the brake belts 139 to prevent the delivery of superposed notes, and are delivered one by one. Accordingly, the note P on the takeout mechanism side is normally projected a little outward from the storage section 20, 21 or 22 so that its forward end is at the nip portion between the rollers 110 and 111 and the brake belts 139. Therefore, if the rotary solenoids 144 and 145 are deenergized to erect the upper and lower flappers **143*a*, 143*b* and 143*c* immediately after the completion of the delivery, all the notes P may possibly not be pulled back to the original position. Accordingly, only the main shaft 100 supporting the rollers 110 and 111 is reversely rotated for a short time after the completion of the delivery. By doing this, the slightly projected note P between the brake belts 139 and the takeout chips 110*a* and 111*a* or 110*b* and 111*b* is also fully returned to its corresponding storage section. After this state is established, the upper and lower flappers 143*a*, 143*b* and 143*c* are erected so that all the notes P can be pulled back to the initial position by the flappers 143*a*, 143*b* and 143*c*.**

Figure 13:
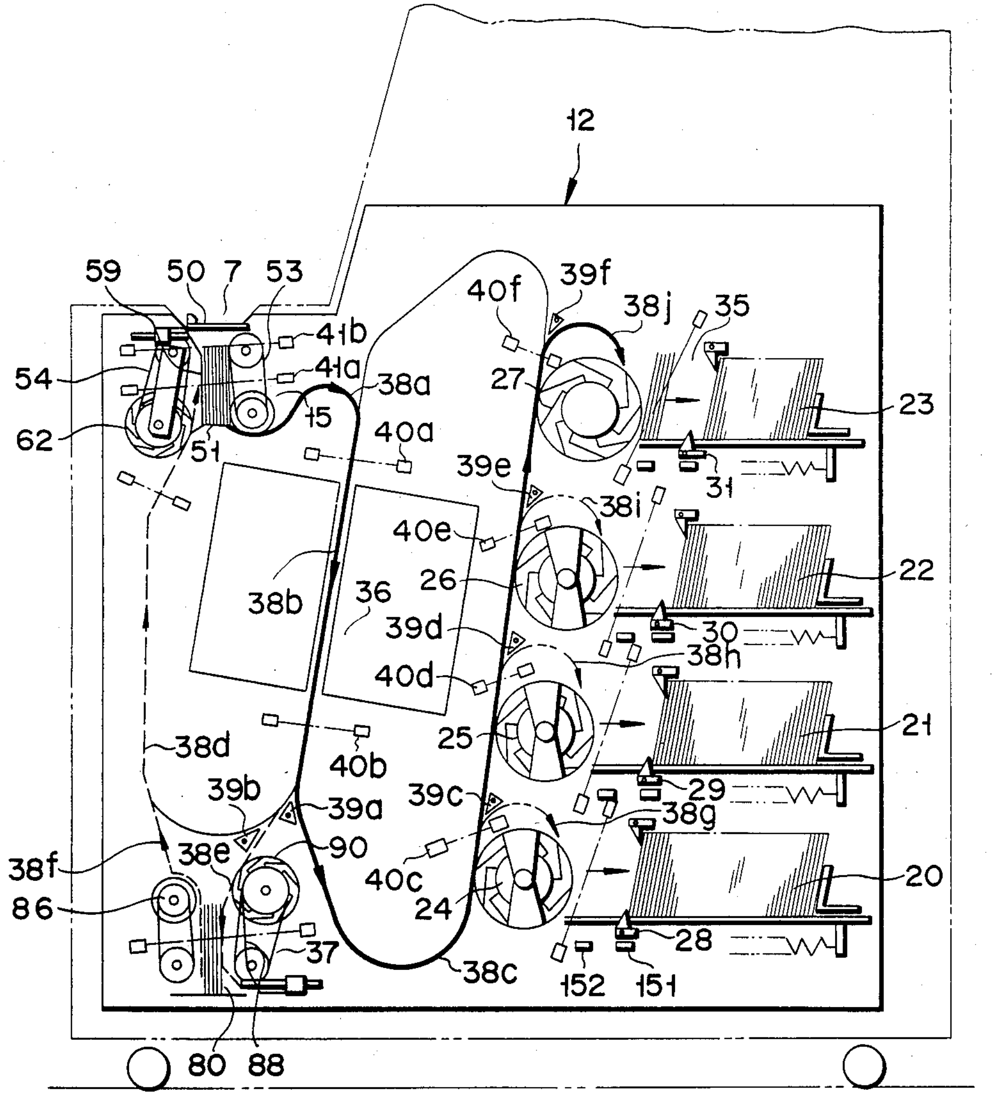
FIG. 13 is a side view for schematically illustrating the flow of notes being withdrawn.

Referring mainly to FIGS. 2 and 13, the manner of recovering missed notes will be described. If notes P are left unreceived at the note inlet/outlet port 7, that is, if the remaining note check sensor **41*b* does not turn to "light" after the passage of a given time, the CPU concludes that the notes P are missed. Then, the notes P are taken into the note storage chamber 51, and the door member 50 is closed, as described before with reference to FIG. 4C. Thereafter, the notes P are fed one by one into the apparatus to be rechecked. Those notes P which have been judged fit after the recheck are carried through the first, second, third and tenth note conveyor paths 38*a*, 38*b*, 38*c* and 38*j* as indicated by thick full-line arrow in FIG. 13, and are collected in the temporary storage space 35 of the fourth storage section 23** (recovery section).

On the other hand, those notes P which have failed to be judged by the recheck are collected in the reversal mechanism 37, as indicated by broken-line arrow. Thereafter, the notes P are returned to the note storage chamber 51 facing the note inlet/outlet port 7 and are subjected to an additonal recheck.

The missed notes P are rechecked because not all but only part of returned or dispensed notes P at the note inlet/outlet port 7 will possibly be missed by the customer. Such partial extraction of the notes P may take place if those notes P, among others projected from the note inlet/outlet port 7, which are hidden from the eyes of the customer, are bent and fallen on the other side. The missed notes, therefore, are rechecked for amount.

Data on the recheck are recorded on a duplicate journal **160*a*, as described later with reference to FIG. 19**, so that transactions involing missed notes, as well as the amount of the missed notes, can be identified.

The missed notes P are collected in the temporary storage space 35 of the fourth storage section 23 (recovery section), and are separated from previously collected notes by the separator mechanism 31 until subsequent missed notes P are introduced. Thus, the customer can readily recover the missed notes P if he realizes his mistake and acts accordingly.

In the circulation type depositing/dispensing mechanism, it is essential to make efficient use of the notes P. Therefore, the recovered notes are not uniformly stored in the fourth storage section 23. Those notes which can be identified in denomination and can be counted as fit notes are stored in the first to third storage sections 20 to 22 corresponding to their respective denominations, as indicated by two-dot chain line in FIG. 13, by shifting a storage mode change-over switch (not shown). Only unidentifiable notes are stored in the fourth storage section 23.

The combination of this system with the note circulation system provides an ATM (automatic teller machine) with a high efficiency of fund operations. Hereupon, the circulation type ATM is characterized in that the notes P circulate therein. For a quick turnover of the fund, therefore, it is essential to make the current amounts of notes P stored in the individual storage sections 20, 21, 22 and 23 accessible to inquiry. Namely, in the depositing and dispensing units of the prior art ATM, a minimal number of notes P are set for dispensation. This leads to frequent use of the functions for preliminary empty detection and empty detection. Thus, deposited notes are frequently taken out from the ATM and delivered to the cashier, thereby reducing stagnant funds in the ATM and increasing the efficiency of fund operations for the whole office.

In the circulation type ATM of the invention, however, each storage section is used both for deposited notes and for notes to be dispensed. Therefore, the four detectors 43, 42, 45 and 44 for preliminary empty detection, empty detection, preliminary full detection and full detection are attached to each of the safe cassettes 16, 17, 18 and 19. The number of the notes P staying in the safe cassettes 16 to 19 depends on the balance between deposited and dispensed notes in number. Where there are more deposited notes than dispensed notes, it is not very efficient to leave stored notes until the preliminary full detector 45 and the full detector 44 operate. Lately designed safe cassettes are larger so that notes therein can continuously be used for a long time without being taken out of the apparatus. Accordingly, a large sum of money (e.g., two hundred thousand dollars, two hundred thousand marks or forty thousand pounds) can possibly be kept in one of the safe cassettes 16 to 19.

Conventionally, the amount of money to be dispensed is estimated on the basis of several data, such as the day of the week, time zone, etc. Efficient fund operations may enable the use of a minimal number of notes. It is difficult, however, to achieve such efficient operations in the apparatus in which the deposited notes are circulated to be used for dispensation.

Thereupon, the amount and denomination of deposited and dispensed money or notes detected by the judgment mechanism 36 are previously stored in a memory section 161 (FIG. 16), and the numbers of notes in the safe cassettes 16 to 19 or the storage sections 20 to 23 are displayed as required.

Figure 14:
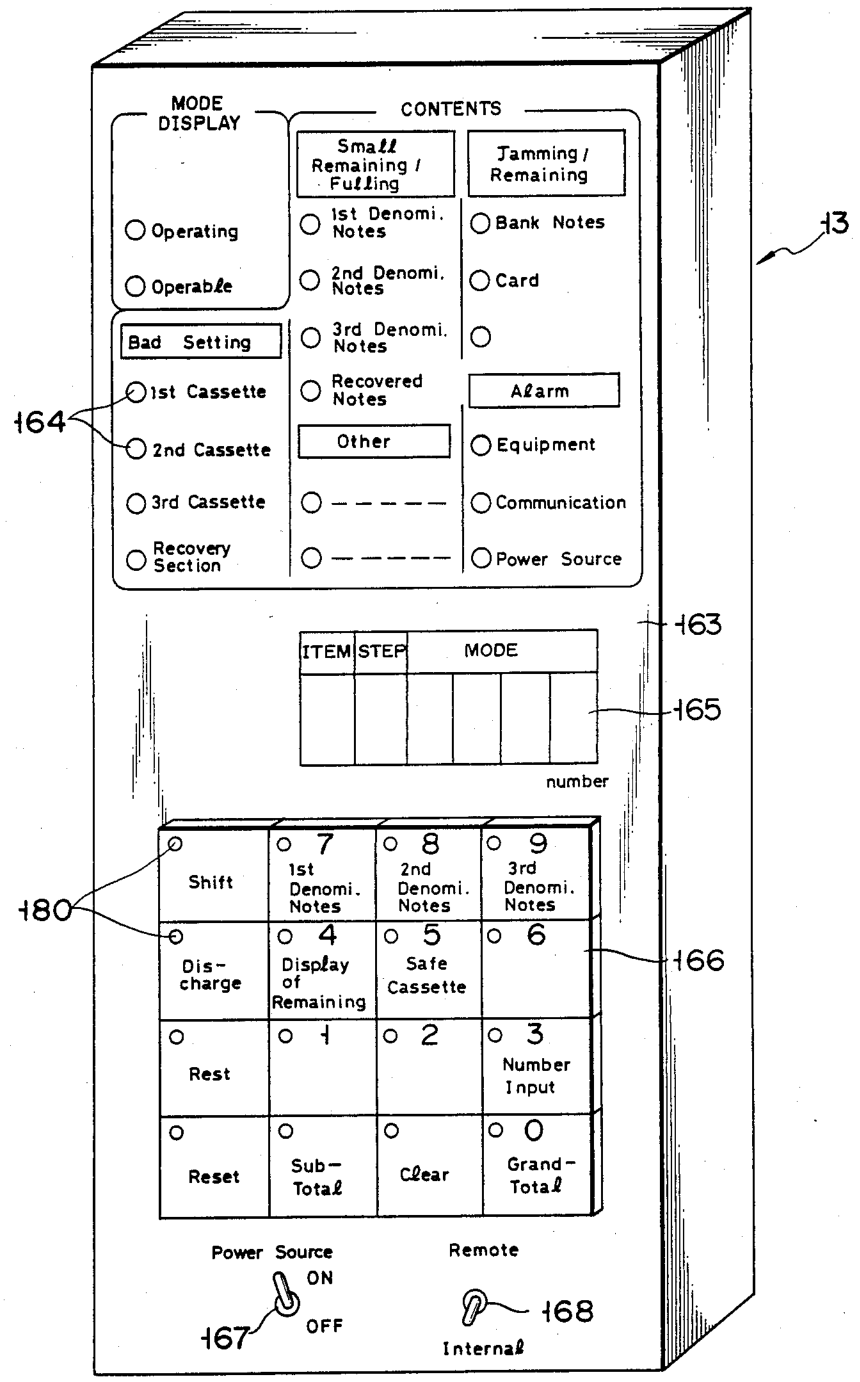
FIG. 14 is a perspective view of an internal monitor unit.
Figure 15:
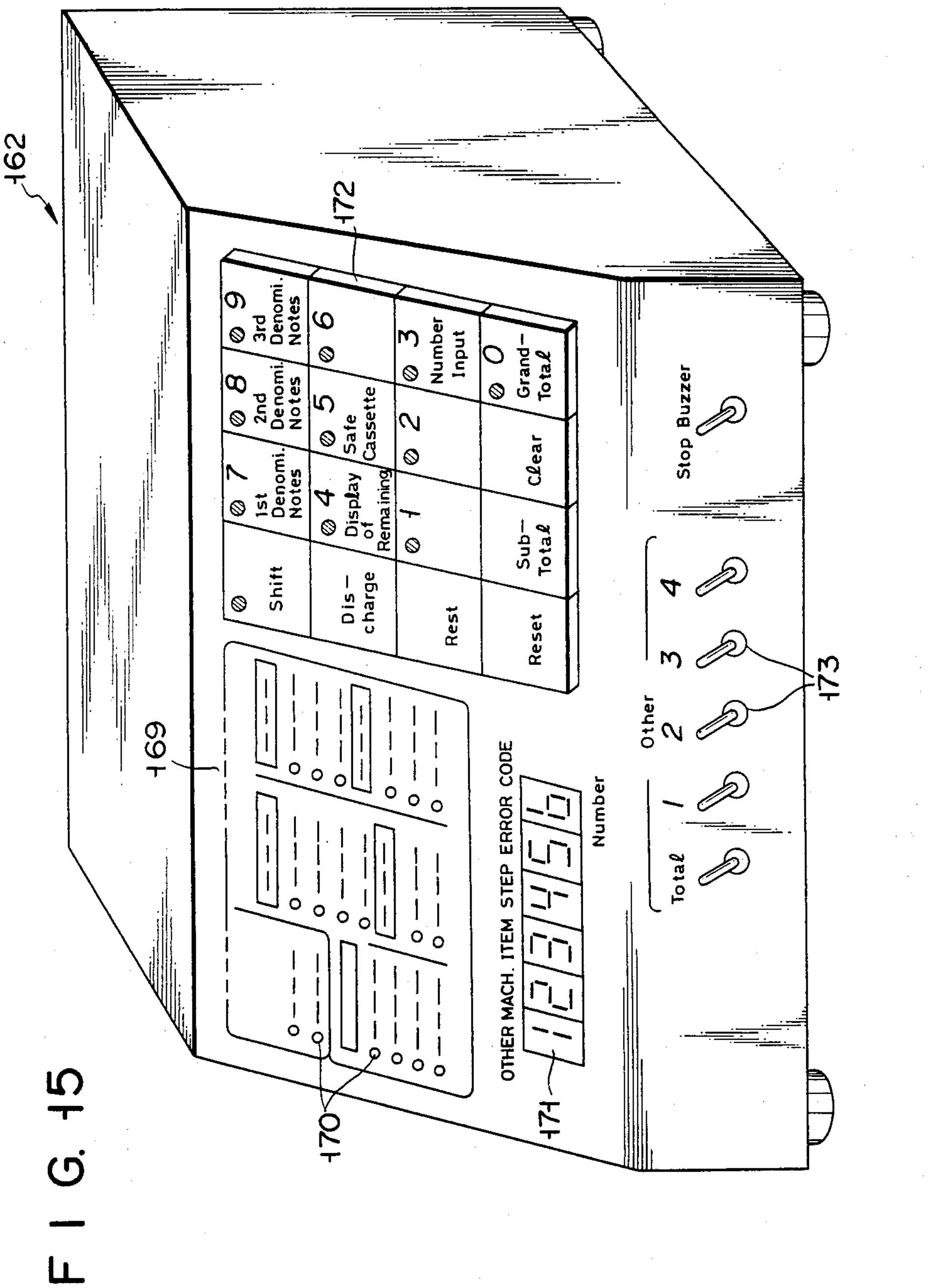
FIG. 15 is a perspective view of a remote monitor unit.

The numbers of notes in the storage sections 20 to 23 are indicated on the internal monitor unit 13 (FIGS. 1 and 14) or an external remote monitor unit 162 (FIG. 15). Thus, the numbers of remaining notes in the storage sections 20 to 23 can be noticed at once without a close examination which would require interruption of the operation of the apparatus. This prevents idle funds.

Presently, the setting of the notes P in the each safe cassette 16, 17, 18 or 19 is managed by a clerk in charge. Therefore, the apparatus is not informed of the number of the notes P set therein. The cashier cannot notice the shortage of stored notes until the preliminary empty detector 43 and the empty detector 42 detect the number of remaining notes. In order to identify the current total amount of remaining notes, therefore, it is necessary that the apparatus be informed of the number and denomination of the supplied notes P for dispensation.

For the information to the apparatus, the notes P for dispensation are supplied and resupplied through the note inlet/outlet port 7, and are filled into the storage sections through the judgment mechanism 36 along the course of the normal flow of deposited notes. Alternatively, the amount of money and the denominations of notes set by the operator are stored in the memory system of the apparatus by key operation.

In the former method, the apparatus judges the supplied notes for itself. In case of account errors, therefore, it is unnecessary to check to see if a right number of notes are set in the apparatus. Thus, the machine counting is clear-cut and error-free.

In the latter method, the notes for supply or resupply are set from behind the apparatus, and the amount of money is applied to the input of the apparatus through the internal monitor unit 13. Thus, the replenishment can be achieved quickly. Normally, the notes P are resupplied in bundles of one hundred under sealed. A bundle of notes P generally contains one hundred notes and requires no counting. Therefore, the current number of remaining notes in the apparatus can be detected without lowering the accuracy of close examination.

Other methods of resupplying notes for dispensation are as follows. Missed notes may be collected in the fourth storage section 23 (recovery section) once or twice a day, if any. Therefore, it is proposed that a collection/takeout device be attached also to the fourth storage section 23. If recovered notes P stagnate in the fourth storage section 23, they are removed, and notes P for resupply are set therein. Thus, the notes P may be judged and supplied into the apparatus through the operation on the internal monitor unit 13.

The point is that the amount and denomination of the supplied notes P for dispensation be stored and operated in the apparatus by some measures.

In the aforesaid operation, handling of rejected notes from the storage sections 21 and 22 at the time of dispensation is a problem. The rejected notes are those fit notes, among the second- and third-denomination notes Pb and Pc stored in the second and third storage sections 21 and 22, which are skewed or superposed at the time of takeout operation. These rejected notes are stored in the first storage section 20. In most cases, the notes are skewed independently and superposed by twos. In counting, therefore, each skewed note should naturally be regarded as one in number, while each set of superposed notes should be regarded as two.

Referring now to FIG. 14, the internal monitor unit 13 will be described in detail. The internal monitor unit 13 is disposed at the rear portion (see FIG. 1) of the interior of the housing 2 of the automatic depositing/-dispensing apparatus 1, and is operated by a clerk at the back of the housing 2. An operating panel 163 bears thereon a plurality of indicating lamps 164 for indicating the operating conditions of the mechanism, a digital display section 165, and a keyboard 166. The digital display section 165 consists of, for example, five digits. Normally, the code number indicating a selected transaction item and the operation step number of the ATM are each represented by one digit, while the error code number indicating an operating error of the ATM is represented by three digits. Also, the digital display section 165 indicates the number of notes stored in each storage section, such as the number of remaining notes for payment, using all of its digits. The keyboard 166 is used for giving instructions for the inputting of various data and processing instruction signals or for storage indication. Among several operation keys, each essential key incorporates an indicating lamp 180, which flows as required to indicate the effectiveness of the depression of key. Numerals 167 and 168 designate a power switch for the apparatus as a whole and a monitor unit changeover switch, respectively.

FIG. 15 shows the remote monitor unit 162. The remote monitor unit 162 is located in a region (e.g., in a monitor room) remote from the housing 2. Like the internal monitor unit 13, the remote monitor unit 162 monitors the conditions of the apparatus and performs processing operations. An operating panel 169 bears thereon indicating lamps 170, a digital display section 171, and a keyboard 172 having the same functions as those of the internal monitor unit 13. The remote monitor unit 162 is connected with a plurality of other ATM's than the depositing/dispensing apparatus 1 shown in FIG. 1. Thus, a single remote monitor unit can monitor and control a plurality of ATM's. The operating panel 169 is provided with designating switches 173 for designating one of the ATM's. If the operator designates an ATM to be monitored and controlled by activating one of the designating switches 173, then the remote monitor unit 162 makes the same indication as the internal monitor unit 13 of the designated ATM.

Figure 16:
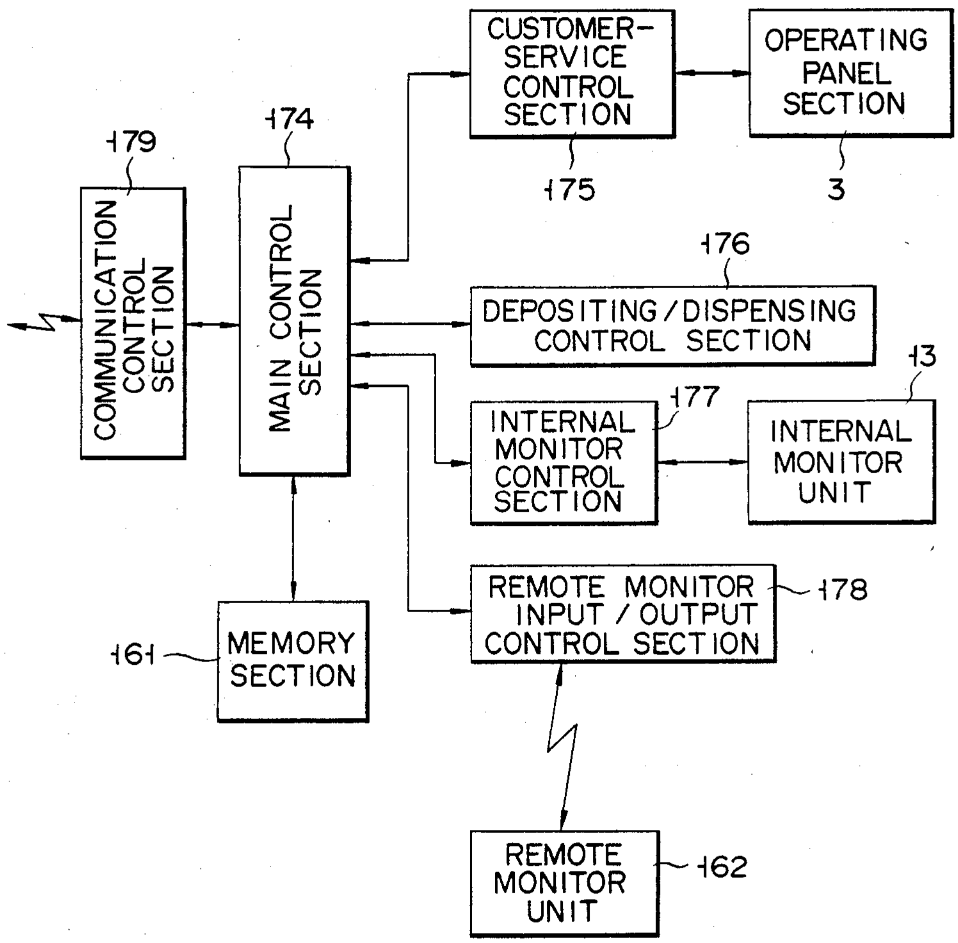
FIG. 16 is a block view schematically showing a general control system.

FIG. 16 schematically shows the control system of the depositing/dispensing apparatus 1. The control system comprises a main control section 174, a customer-service control section 175 for controlling the operating panel section 3, a depositing/dispensing control section 176 for controlling the depositing/dispensing mechanism 12 (in note feeding, payment, counting, etc.), an internal monitor control section 177 for controlling the internal monitor unit 13, a remote monitor input/output control section 178 for controlling the remote monitor unit 162, and a communication control section 179 for on-line communication with a deposit ledger of a center (not shown). The operations of the control sections 175 to 179 are all controlled by the main control section 174. The main control section 174 is connected with control sections (not shown) for the card/slip processing unit 11 and the passbook reader/printer. Also, the main control section 174 is connected with the memory section 161 for previously storing the denomination and number of notes P in the storage sections 20 to 23 in the automatic depositing/dispensing apparatus 1.

The operation of the apparatus with the aforementioned construction will now be described. When newly storing notes to be dispensed, the current number of remaining notes is indicated, and the stored number is input as follows. In checking up on the remaining number of the second-denomination notes Pb stored in the second storage section 21, the operator sets the change-over switch 168 of the internal monitor unit 13 to INTERNAL. Then, the operator depresses a SHIFT key, a SAFE CASSETTE key, a DISPLAY OF REMAINING key, and a SECOND DENOMINATION NOTES key on the keyboard 166 in the order named. As these operation keys are depressed, the indicating lamps 180 incorporated therein are turned on to indicate that the keys are in the working or effective state. The display section 165 indicates the currently stored number of the second-denomination notes Pb in the second storage section 21. When the internal monitor control section 177 receives input data from the keyboard 166, it supplies the data to the main control section 174. Receiving these input data, the main control section 174 decides on the effectiveness of the data. If the data are judged effective, light-on data of their corresponding indicating lamps 180 are supplied to the internal monitor control section 177. Based on the light-on data, the internal monitor control section 177 turns on the indicating lamps 180 in the corresponding operation keys. Based on the input data, moreover, the main control section 174 reads out remaining number data stored in the memory section 161, that is, remaining number data on the second-denomination notes Pb in the second storage section 21, and supplies the data to the internal monitor control section 177. As a result, the internal monitor control section 177 causes the display section 165 of the internal monitor unit 13 to indicate the remaining number data. Thus, the operator can notice the remaining number of the second-denomination notes Pb stored in the second storage section 21, visually observing the contents of indication on the display section 165.

The replenishment of the second storage section 21 with the second-denomination notes Pb will now be described. After the aforesaid remaining number indication, a NUMBER INPUT key and the SECOND DENOMINATION NOTES key are depressed successively. Then, the SHIFT key on the keyboard 166 is depressed again so that a number can be inputted through the keyboard 166. At this time, the indicating lamp 180 in the SHIFT key is turned off, while the indicating lamps 180 in the SAFE CASSETTE key, NUMBER INPUT key, and the SECOND DENOMINATION NOTES key are turned on. Thereafter, the number of the second denomination notes Pb resupplied to the second storage section 21 is inputted by using the digit keys 0 to 9 on the keyboard 166. The unit of the number input is e.g. ten, so that an input data "120" is inputted when 1,200 notes are newly set in the apparatus. If a wrong input data is used, a CLEAR key is depressed, and a right number is then inputted. Thus, the internal monitor control section 177 supplies the inputted number data "120" to the main control section 174. Thereupon, the main control section 174 supplies the internal monitor control section 176 with a display number data "1200" corresponding to the supplied number data "120". Thus, the internal monitor control section 176 indicates the display number data on the display section 165. After visually observing the indicated number "1200", the operator depresses again the SHIFT key if the indicated number is right, and then depresses the NUMBER INPUT key. As a reslt, the interal monitor control section 177 supplies key depression signals to the main control section 174. Thereupon, the main control section 174 adds the input number data to the remaining number data for the second-denomination notes Pb in the second storage section 21 stored in the memory section 161, and supplies the internal monitor control section 177 with signals for turning off the indicating lamps 180 in the SAFE CASSETE key and the SECOND DENOMINATION NOTES key, and for initializing the display section 165. Thus, the remaining number data for the second-denomination notes Pb in the memory section 161 coincides with the actual number of the second-denomination notes Pb stored in the second storage section 21.

Figure 17A:
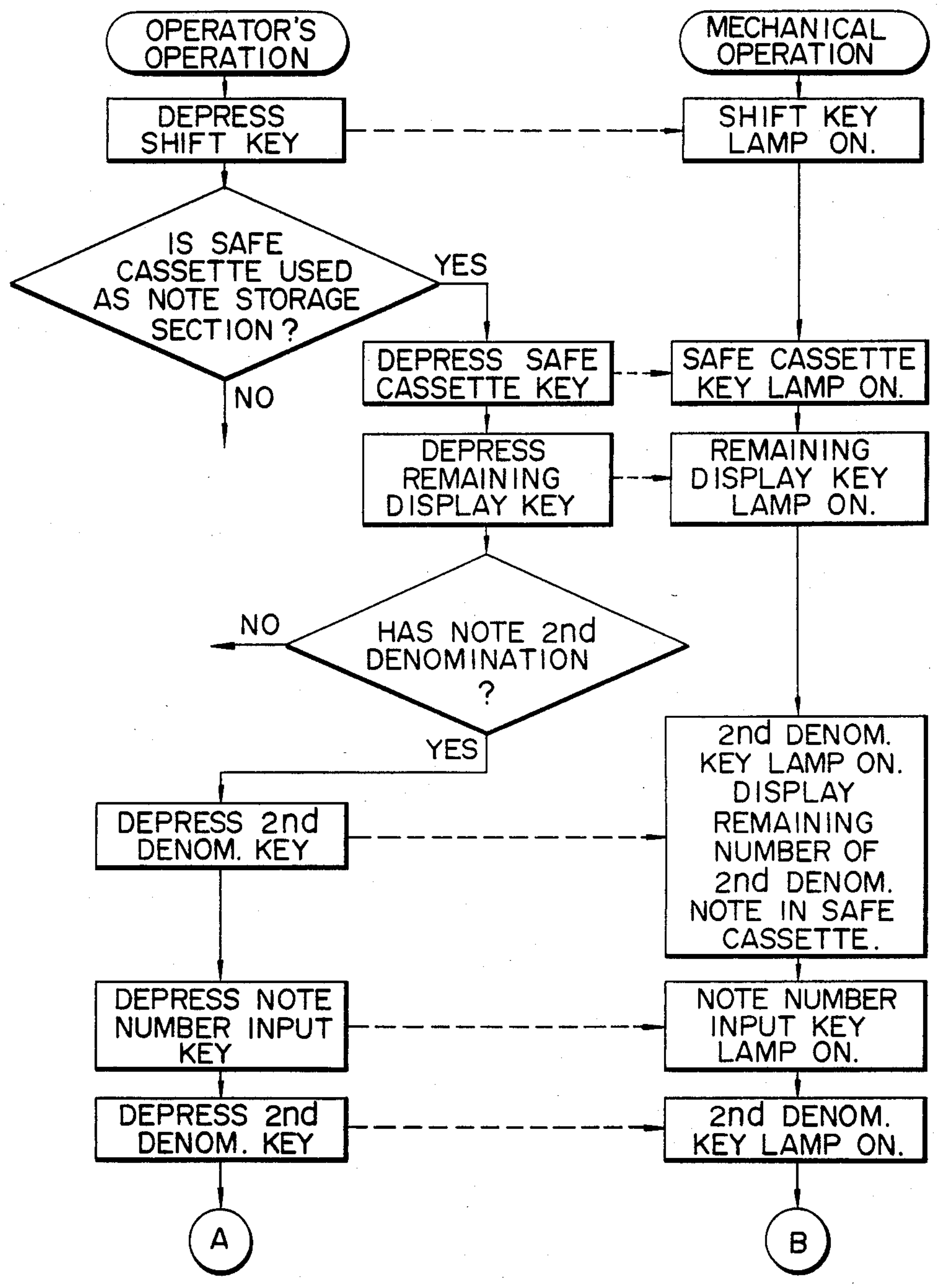
FIGS. 17A and 17B are flow charts showing example of operator operations and machine operations on the internal monitor unit.
Figure 17B:
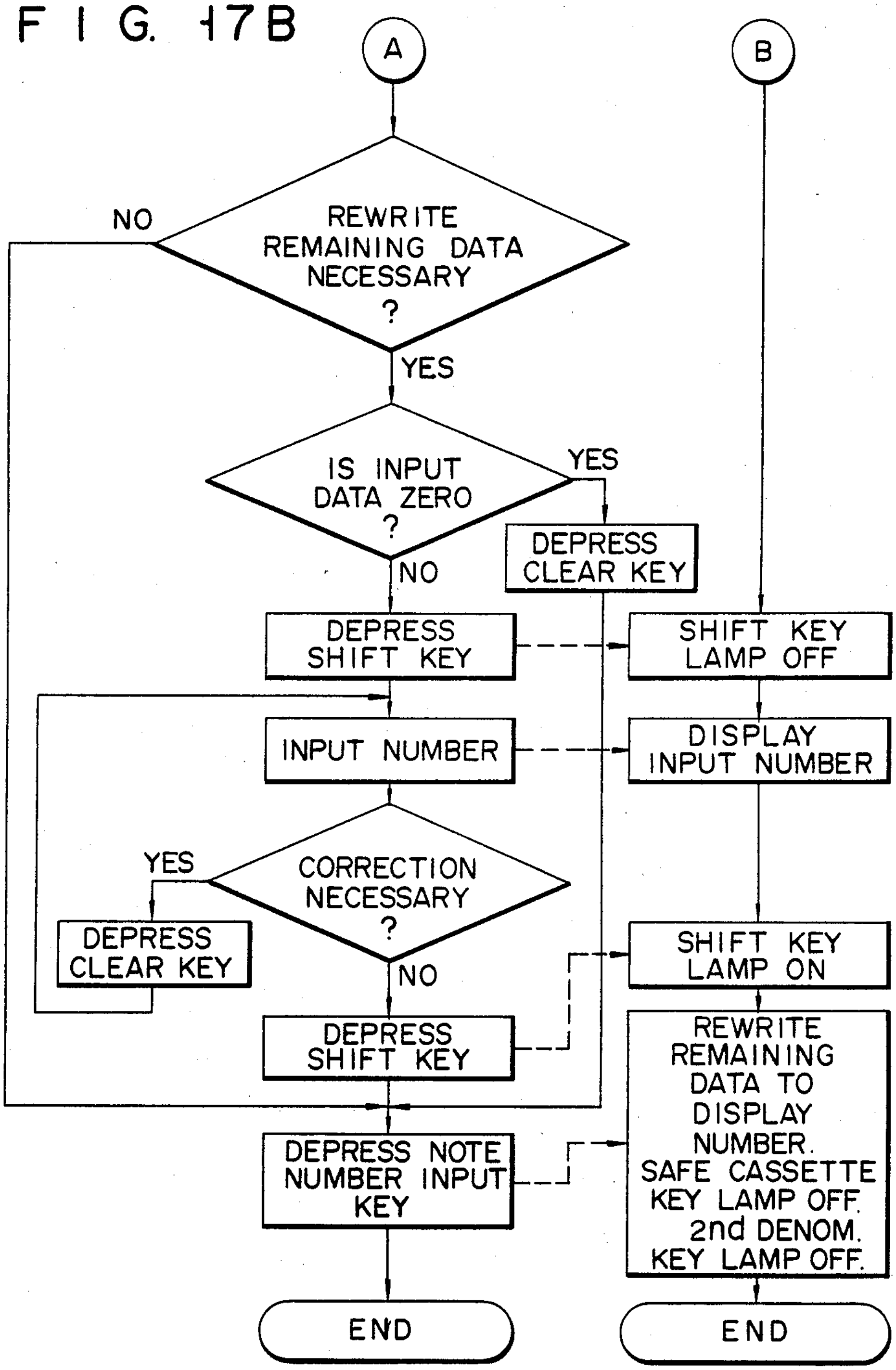

FIG. 17 is a flow chart illustrating the aforementioned processes of operator's operation and mechanical operation.

In the description to follow, the operations include an indicating operation for the remaining number of the second-denomination notes Pb and a data rewriting operation accompanying the replenishment. The same operations may be performed for the notes of the other denominations.

Figure 18:
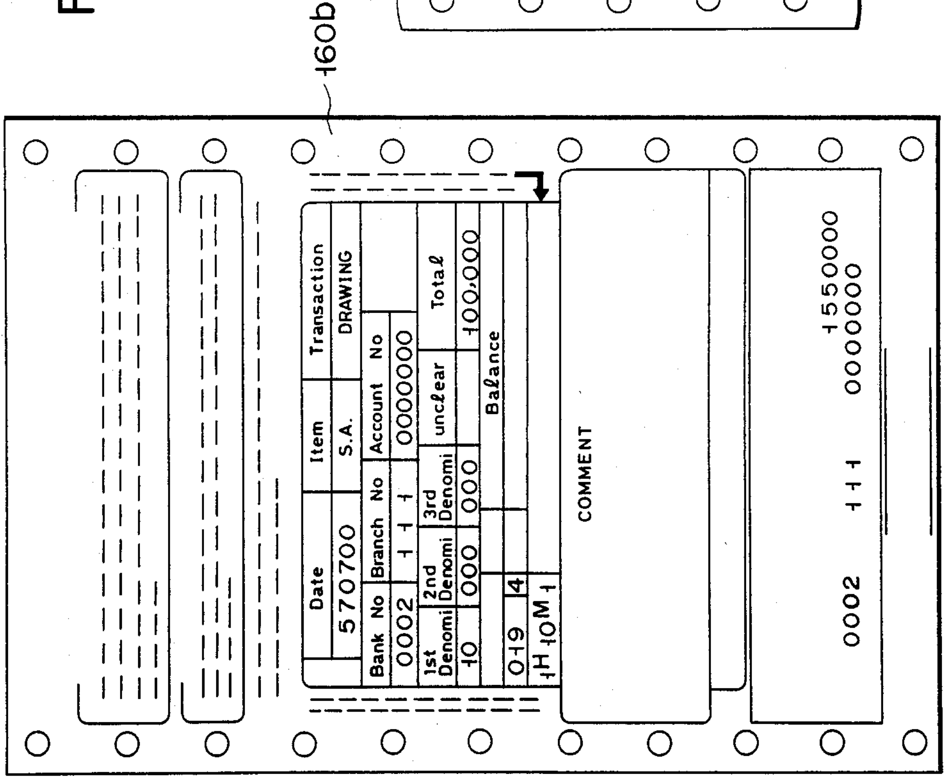
FIG. 18 is a plan view showing an example of a format of a slip issued at the end of a transaction.

When using the remote monitor unit 162, the change-over switch 168 of the internal monitor unit 13 is set to REMOTE, and a desired one of the designating switches 173 of the remote monitor unit 162 is set to ON. After this, the aforementioned operations are performed. The depositing/dispensing apparatus 1 records several data for each transaction on two superposed journal blanks 160 and 160' (FIGS. 20 and 21) by means of the card/slip processing unit 11. The recorded data include the data of transaction, item of transaction, kind of transaction designated by customer, bank number, branch number, account number, effectiveness code, number of notes for each denomination, transaction amount, time instructions, etc. One of the journal blanks is wound as the duplicate journal 162*a* around a reel 181 (FIGS. 20 and 21), while the other journal blank is delivered to the slip outlet slot 6 in the form of slips 160*b* as shown in FIG. 18 which are to be issued when transactions are made without the use of passbooks. Those slips 160*b* which need not be issued are collected in a slip storage box 182 (FIG. 20).

If there are any missed notes P, as described before, the date of transaction, item of transaction, kind of transaction, bank number, office number, account number, denomination and number of missed notes, effectiveness code, time, message "RECOVER OF MISSED NOTES", etc., are recorded on the journal blanks 160 and 160' by means of the card/slip processing unit 11. Part of the journal blank 160' is stored in the slip storage box 182 as a memorandum slip 160*b'* for missed notes as shown in FIG. 19. Thus, the details of the missed notes can later be specified.

Figure 20:
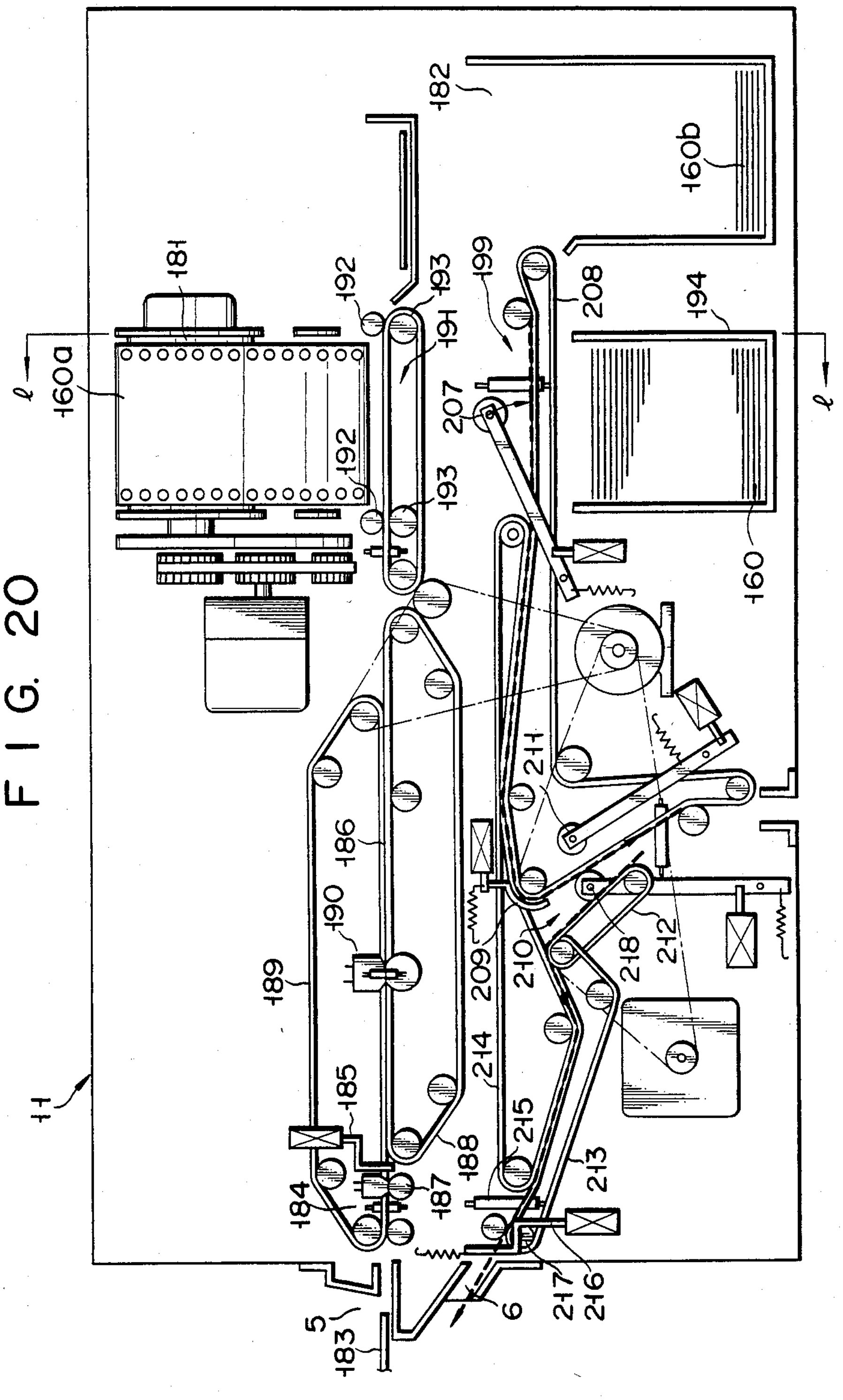
FIG. 20 is a vertical side sectional view schematically showing a card/slip processing unit.
Figure 21:
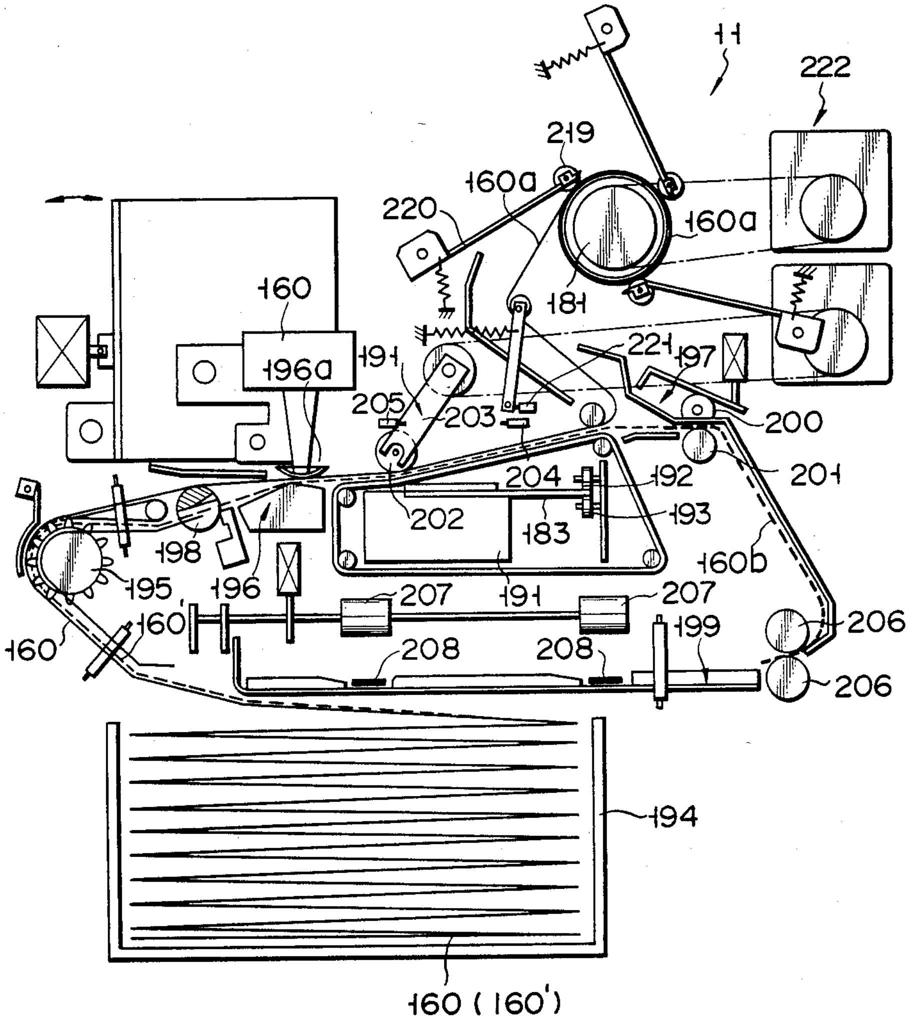
FIG. 21 is a sectional view taken along line 1 - 1 of FIG. 20.

Referring now to FIGS. 20 and 21, the card/slip processing unit 11 will be described in detail. The card/slip processing unit 11 reads customer's information recorded on a magnetic stripe (not shown) of a magnetic card 183 inserted through the card inlet slot 5, and prints the journal blanks 160 and 160' made of carbonless duplicating paper with the transaction data and information recorded on an embossed section 183*a* of the magnetic card 183. Thus, the duplicate journal 160*a* and the slip 160*b* are prepared.

When the magnetic card 183 is inserted through the card inlet slot 5, as shown in FIG. 20, it is detected by a card detector 184. Thereupon, a shutter 185 is opened, and the drive system for a card conveyor path 186 starts to operate. At this point of time, the magnetic card 183 is still under customer control. Then, a magnetic head 187 detects the existence or nonexistence of magnetic information on the magnetic stripe of the magnetic card 183. If no magnetic information is detected, conveyor belts 188 and 189 constituting the card conveyor path 186 are driven reversely. As the conveyor belts 188 and 189 run in the reverse direction, the magnetic card 183 is transferred at constant speed until its trailing edge is detected by the card detector 184. Thus, the magnetic card 183 is rechecked for the existence of magnetic information.

If no magnetic information is detected on the card even after the recheck, then the card is judged as wrong and returned to the card inlet slot 5.

If magnetic information is found on the magnetic card 183 by the first or second detection, the card 183 is fed in the direction of arrow X through the card conveyor path 186. The magnetic information is read by a magnetic head 190 in the middle of the card conveyor path 186.

Thereafter, the magnetic card 183 is carried to an embossment station 191, and stopped at the position where it is held at both ends between rollers 192 and 193. (The flow of the card 183 is indicated by thick solid line arrow in FIG. 20.)

As shown in FIG. 21, the embossment station 191 faces the middle portion of the transfer path of the journal blanks 160 and 160'. The journal blanks 160 and 160' to be used for a number of transactions are stored in zigzags in a blank storage box 194. Each section of the zigzag blanks is used for one transaction. The forward end portion of the first journal blank 160 is passed around a feed sprocket 195. Set in this manner, the first journal blank 160 is automatically wound as the duplicate journal 160*a* around the take-up reel 181, successively passing through a printing section 196, the embossment station 191, and a separating section 197.

The forward end portion of the second journal blank 160' is passed around the feed sprocket 195 is overlapped relation with the first journal blank 160. Set in this manner, the second journal blank 160' is automatically transferred as the slip 160*b* to a turnabout section 199, successively passing through a cutter section 198, the printing section 196, the embossment station 191, and the separating section 197. (The flow of the slip 160*b* in this operation is indicated by the thick broken-line arrow in FIG. 21.)

When the magnetic card 183 is set in the embossment station 191, the customer's information from the magnetic stripe of the magnetic card 183 and the transaction data are printed on the two journal blanks 160 and 160' corresponding to the duplicate journal 160*a* and the slip sheet by a dot head 196*a* of the printing section 196. The first and second journal blanks 160 and 160' are fed for a given distance after the rear end of that portion of the second journal blank 160' which corresponds to the slip 160*b* is cut by the cutter section 198. After this feeding, the printing start position of the journal blanks 160 and 160' faces the dot head 196*a*. Then, the journal blanks 160 and 160' are synchronously fed and printed for a plurality of lines by the dot head 196*a*. When the printing on the last line is completed, the duplicate journal 160*a* and the slip 160*b* are fed for an additional distance of several tens of millimeters, and are located in the position where the forward end of the slip 160*b* is held between a conveyor roller 200 and a pinch roller 201. At this time, those portions of the duplicate journal 160*a* and the slip 160*b* overlapping each other which are to be printed by the embossed section 183*a* of the magnetic card 183 held in the embossment station 191 face the embossed section 183*a*.

Then, a transcription roller 202 of the embossment station 191 moves to the left, as indicated by dashedline arrow of FIG. 21, thereby pressing the duplicate journal 160*a* and the slip 160*b* against the embossed section 183*a* of the magnetic card 183. Thus, visible information recorded on the magnetic card 183 by embossing, including the customer's name, bank number, office number, account number, etc., is printed on the duplicate journal 160*a* and the slip 160*b*. The position of the transcription roller 202 in this printing operation is detected by detecting the position of a roller supporting arm 203 by means of detectors 204 and 205.

After the embossed information is transcribed, only the conveyor roller 200 rotates, so that the slip 160*b* whose forward end is held between the conveyor roller 200 and the pinch roller 201 is let out. The slip 160*b* is fed to the turnabout section 199 through a pair of conveyor rollers 206 rotating at high speed.

At the turnabout section 199, a pair of pinch rollers 207 located above presses the slip 160*b* against a pair of conveyor belts 208. Thereafter, the conveyor belts 208 travel to feed the slip 160*b* in the opposite direction to the magnetic card feeding direction (direction of arrow X) of the card conveyor path 186, thereby delivering the slip 160b to a switch back section 210 through a gate 209. Thus, the slip 160b is held between the conveyor belts 208 and a pinch roller 211.

Thereafter, the pinch roller 211 moves in the counter-clockwise direction of FIG. 20 so as to pass between the conveyor belts 208, thereby pressing the slip 160b against a conveyor belt 212 which faces the connveyor belts 208 with a phase difference. As conveyor belts 212, 213 and 214 travel, the slip 160b is delivered to the slip outlet slot 6. (The flow of the slip 160b in this operation is indicated by thick broken-line arrow in FIG. 20.)

When the forward end of the slip 160b is detected by a detector 215, a shutter 216 is opened. Then, when the rear end of the slip 160b is detected by the detector 215, the transfer of the slip 160b is stopped with the rear end of the slip 160b held between the conveyor belt 213 and a pinch roller 217.

If the slip 160b is not removed after the passage of a given time, then it is considered to have been missed, and recovered in the slip storage box 182.

In a passbook transaction, the slip 160b need not be issued. Therefore, the slip 160b delivered to the switch-back section 210 is collected in the slip storage box 182 by reversing the conveyor belts 208 with the slip 160b pressed by a pinch roller 218. Among the slips 160b collected in the slip storage box 182, those missed slips 160b can definitely be distinguished from those slips 160b which need not be issued, since they are reversed as compared with one another.

The duplicate journal 160a is passed around a tension roller 219, and then wound around the take-up reel 181. Depending on the tension of the duplicate journal 160a, a supporting arm 220 for the tension roller 219 is rocked. On the basis of the displacement of the arm 220 detected by a detector 221, the drive time of a drive motor 222 for the take-up reel 181 is controlled so that the duplicate journal 160a is wound around the reel 181 with a substantially constant tension.

Figure 19:
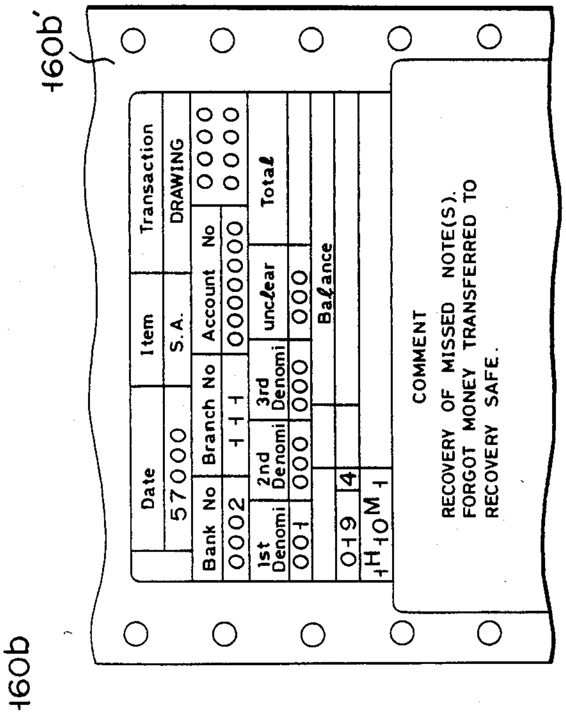
FIG. 19 is a plan view of an example of a format of a recovered note slip issued and stored at the time of recovery of missed notes.

The memorandum slip 160b' for missed notes, as shown in FIG. 19, is collected in the slip storage box 182 in the same manner as in the passbook transaction after it is printed.

Notes are subject to the so-called note reform whereby they are replaced with new ones having quite different designs or patterns once in a certain period of time (10 to 15 years). After the reform, former notes are successively withdrawn and are not issued any more so that only the newly issued notes are circulated.

Accordingly, the depositing/dispensing apparatus of this embodiment is provided with the circulation prohibiting switch 46. When this switch 46 is operated, all the former notes are stored in the first storage section 20. Thus, the first storage section 20 serves only as a depositing safe. The newly issued second- and third-denomination notes Pb and Pc are set in the second and third storage sections 21 and 22, which are used for dispensation only.

Normally, the circulation prohibiting switch 46 is set to a first position where it allows notes to circulate for the aforementioned operation. After a note reform, the switch 46 is set as required to a second position where the circulation is prohibited. When the switch 46 is thus set to the second position, the distributing gate 39c is turned to the left to close the seventh conveyor path 38g when the deposited note is judged as a former note by the judgment section 36, thereby collecting in the first storage section 20 all those deposited notes judged to be former notes by the judgment section 36, if any.

The judgment section 36 need not discriminate former notes from newly issued notes. Namely, all deposited notes may be collected together in the first storage section 20.

In this case, the judgment section 36 for judging the deposited notes does not perform fit/unfit detection, since the previously stored notes for dispensation are all new notes and cannot be unfit notes.

If the second- and third-denomination notes Pb and Pc stored in the storage sections 21 and 22 for dispensation are reduced in number, the preliminary empty detector 43 operates and directs the clerk in charge to resupply notes for dispensation. Thus, dispensating transaction can be made without hindrance. On the other hand, if the number of the notes Pb and Pc in the storage sections 21 and 22 increases, then the preliminary full detector 43 operates and directs the clerk in charge to withdarw the stored notes. Thus, the depositing transaction can be made smoothly.

With the conventional apparatus, if the empty detector 42 or the full detector 44 operates, the apparatus is entirely stopped so that the clerk in charge can resupply or take out notes. According to the apparatus of this invention, however, even though it is detected by the full detector 44 that the second or third storage section 21 or 22 is filled up with the notes Pb or Pc, a transaction can be continued without stopping the apparatus while the clerk in charge takes out the notes Pb or Pc. The detection of the fullness of the second or third storage section 21 or 22 indicates that the apparatus contains sufficient notes for dispensation. Thus, the dispensing transaction can be continued without hindrance. The depositing transaction can be continued smoothly by setting the judgment level adjusting switch 47 in the first storage section 20 storing those deposited first-denomination notes Pa unsuitable for dispensation and rejected notes (including unfit second- and third-denomination notes) so that the standards for the fit/unfit detection are raised.

According to this invention, as described in detail herein, there may be provided an automatic depositing/dispensing apparatus capable of circulating and appropriating deposited notes for dispensation, in which those recovered notes which are missed at the time of depositing or dispensation are rechecked so that identifiable notes are stored in storage sections for storing notes for dispensation, and that only unidentifiable notes are collected in a storage section for recovery. Thus, the recovered notes can also be used for dispensation, thereby greatly increasing the efficiency of fund operations.

What is claimed is:

1. An automatic bank note transaction apparatus which stores deposited notes together with previously stored notes and appropriate the deposited notes for dispensation, comprising:

a housing having note inlet/outlet means;

a plurality of note storage means provided in the housing, and including first note storage means for storing the deposited notes and second note storage means for storing notes which are left unreceived in the note inlet/outlet means at the time of depositing or dispensation;

conveyor means for transferring notes between the note inlet/outlet means and individual note storage means;

judgment means attached to the conveyor means for for detecting fit and unfit conditions of notes being transferred from the note inlet/outlet means to the note storage means nad dor generating fit and unfit detection signals, respectively; and diverging means connected to said judgment means and operatively associated with the individual note storage means to direct the notes transferred from the note inlet/outlet means by the conveyor means to corresponding ones of the note storage means in dependence upon the receipt of said fit or unfit detecting signals from said judgment means, wherein said diverging means, in response to receiving said fit detection signal, for directing to the first note storage means those deposited notes which are judged fit by the judgment means, and those notes which are left unreceived in the note inlet/outlet means and recovered, and wherein said diverging means, in response to receiving said unfit detection signal, for returning to the note inlet/outlet means those deposited notes which are judged unfit by the judgment means, and directing to the second storage means those unfit notes which are left unreceived in the note inlet/outlet means and recovered.

2. The automatic bank note transaction apparatus according to claim 1, wherein said judgment means further performs denomination detection, said note storage means further includes third note storage means for storing notes of denomination unavailable for dispensation based on the result of the denomination detection in the judgment means, and said first storage means stores notes of denomination avaiable for dispensation.

3. The automatic bank note transaction apparatus according to claim 2, wherein said diverging means feeds deposited notes of denomination available for dispensation to the first note storage means, based on the result of the denomination detection in the judgment means, deposited notes of denomination unavailable for dispensation to the third note storage means, those notes, among the ones left unreceived in the note inlet/-outlet means and recovered, which can be detected in denomination by the judgment means and are judged fit by the fit/unfit detection, to their corresponding note storage means depending on the detected denomination, and those notes, among the ones left unreceived in the note inlet/outlet means, which cannot be detected in denomination by the judgment means or judged unfit by the fit/unfit detection, to the second note storage means.

4. The automatic bank note transaction apparatus according to claim 3, wherein said conveyor means includes first conveyor means for transferring the deposited notes from the note inlet/outlet means to the individual note storage means, and second conveyor means for transferring the notes taken out of the individual note storage means to the note inlet/outlet means.

5. The automatic bank note transaction apparatus according to claim 4, wherein said first conveyor means shares a common conveyor path with the second conveyor means.

6. The automatic bank note transaction apparatus according to claim 5, wherein said judgment means is provided in said common conveyor path.

* * * * *

UNITED STATES PATENT AND TRADEMARK OFFICE

CERTIFICATE OF CORRECTION

PATENT NO. : 4,571,489

DATED : February 18, 1986

INVENTOR(S) : Yoshihiro WATANABE

It is certified that error appears in the above—identified patent and that said Letters Patent is hereby corrected as shown below:

ON THE FIRST INFORMATION PAGE:

Change "[73] Assignee: Tokyo Shibaura Denki Kabushiki Kaisha, Japan" to --[73] Assignee: Tokyo Shibaura Denki Kabushiki Kaisha, Kawasaki, Japan--.

Signed and Sealed this

*Nineteenth* Day of *August 1986*

[SEAL]

*Attest:*

DONALD J. QUIGG

*Attesting Officer*

*Commissioner of Patents and Trademarks*